(12) United States Patent
Fernando

(10) Patent No.: US 9,118,439 B2
(45) Date of Patent: Aug. 25, 2015

(54) RECEIVER FOR IMBALANCED CARRIERS

(75) Inventor: Udara C. Fernando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 13/584,292

(22) Filed: Aug. 13, 2012

(65) Prior Publication Data

US 2013/0265892 A1 Oct. 10, 2013

Related U.S. Application Data

(60) Provisional application No. 61/621,124, filed on Apr. 6, 2012.

(51) Int. Cl.
*H04L 12/26* (2006.01)
*H04L 5/00* (2006.01)
(Continued)

(52) U.S. Cl.
CPC .............. *H04L 5/001* (2013.01); *H04B 1/1027* (2013.01); *H04B 1/30* (2013.01); *H04B 2001/1072* (2013.01); *H04L 27/3863* (2013.01)

(58) Field of Classification Search
CPC .......................... H04L 27/001; H04L 27/3863
USPC .................................................. 370/252, 328
See application file for complete search history.

(56) References Cited

U.S. PATENT DOCUMENTS 3,911,364 A 10/1975 Langseth et al.
4,035,728 A 7/1977 Ishikawa et al.
(Continued)

FOREIGN PATENT DOCUMENTS

CN 1523912 A 8/2004
CN 1922795 A 2/2007
(Continued)

OTHER PUBLICATIONS

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, No. Dresden, Germany; 20100628, Jun. 22, 2010, XP050449298, [retrieved on Jun. 22, 2010] the whole document.
(Continued)

*Primary Examiner* — Andrew Chriss
*Assistant Examiner* — Voster Preval
(74) *Attorney, Agent, or Firm* — Ramin Mobarhan

(57) ABSTRACT

Techniques for using one or multiple downconverters to receive multiple transmissions sent on multiple carriers are disclosed. In an exemplary design, an apparatus includes first and second downconverters. The first downconverter downconverts a first radio frequency (RF) signal when it is selected. The second downconverter downconverts a second RF signal when it is selected. Each of the first and second RF signals includes multiple transmissions sent on multiple carriers to a wireless device. The first downconverter is selected to perform downconversion for the multiple transmissions when at least one criterion is not met. The first and second downconverters are selected to perform downconversion for the multiple transmissions, based on different mixing frequencies, when the at least one criterion is met. The at least one criterion may relate to imbalance between the multiple carriers, received power of a received RF signal, etc.

20 Claims, 14 Drawing Sheets

(51) Int. Cl.
   *H04B 1/10* (2006.01)
   *H04B 1/30* (2006.01)
   *H04L 27/38* (2006.01)

(56) References Cited

U.S. PATENT DOCUMENTS

| | | | |
|---|---|---|---|
| 4,035,729 A | 7/1977 | Perry | |
| 4,246,655 A | 1/1981 | Parker | |
| 4,326,294 A | 4/1982 | Okamoto et al. | |
| 4,715,048 A | 12/1987 | Masamura | |
| 4,742,563 A | 5/1988 | Fukumura | |
| 4,756,023 A | 7/1988 | Kojima | |
| 4,969,207 A | 11/1990 | Sakamoto et al. | |
| 5,056,411 A | 10/1991 | Baker | |
| 5,128,630 A | 7/1992 | Mijuskovic | |
| 5,291,519 A | 3/1994 | Tsurumaru | |
| 5,321,850 A | 6/1994 | Backstrom et al. | |
| 5,345,601 A | 9/1994 | Takagi et al. | |
| 5,390,342 A | 2/1995 | Takayama et al. | |
| 5,559,838 A | 9/1996 | Nakagoshi | |
| 5,566,364 A | 10/1996 | Mizoguchi et al. | |
| 5,694,396 A | 12/1997 | Firouzbakht et al. | |
| 5,697,083 A | 12/1997 | Sano | |
| 5,761,613 A | 6/1998 | Saunders et al. | |
| 5,794,159 A | 8/1998 | Portin | |
| 5,805,643 A | 9/1998 | Seki et al. | |
| 5,805,989 A | 9/1998 | Ushida | |
| 5,835,853 A | 11/1998 | Enoki et al. | |
| 5,940,452 A | 8/1999 | Rich | |
| 5,999,815 A | 12/1999 | Tenbrook et al. | |
| 5,999,990 A | 12/1999 | Sharrit et al. | |
| 6,026,288 A | 2/2000 | Bronner | |
| 6,040,732 A | 3/2000 | Brokaw | |
| 6,044,254 A | 3/2000 | Ohta et al. | |
| 6,063,961 A | 5/2000 | Kroner | |
| 6,069,923 A | 5/2000 | Ostman et al. | |
| 6,088,348 A | 7/2000 | Bell, III | |
| 6,208,844 B1 | 3/2001 | Abdelgany | |
| 6,249,687 B1 | 6/2001 | Thomsen et al. | |
| 6,407,689 B1 | 6/2002 | Bazarjani et al. | |
| 6,424,683 B1 | 7/2002 | Schoellhorn | |
| 6,430,237 B1 | 8/2002 | Anvari | |
| 6,472,947 B1 | 10/2002 | Zeitz | |
| 6,473,601 B1 | 10/2002 | Oda | |
| 6,522,895 B1 | 2/2003 | Montalvo | |
| 6,535,725 B2 | 3/2003 | Hatcher et al. | |
| 6,600,759 B1 | 7/2003 | Wood | |
| 6,600,907 B1 | 7/2003 | Taguchi | |
| 6,600,931 B2 | 7/2003 | Sutton et al. | |
| 6,657,498 B2 | 12/2003 | Park et al. | |
| 6,728,517 B2 * | 4/2004 | Sugar et al. | 455/73 |
| 6,806,777 B2 | 10/2004 | Franca-Neto | |
| 6,819,941 B2 | 11/2004 | Dening et al. | |
| 6,888,888 B1 | 5/2005 | Tu et al. | |
| 6,952,594 B2 | 10/2005 | Hendin | |
| 6,954,446 B2 | 10/2005 | Kuffner | |
| 6,983,132 B2 | 1/2006 | Woo et al. | |
| 6,985,712 B2 | 1/2006 | Yamakawa et al. | |
| 6,987,950 B2 | 1/2006 | Coan | |
| 7,013,166 B2 | 3/2006 | Clifford | |
| 7,023,272 B2 | 4/2006 | Hung et al. | |
| 7,024,172 B1 | 4/2006 | Murphy et al. | |
| 7,039,377 B2 | 5/2006 | Yates | |
| 7,123,891 B2 | 10/2006 | Loke | |
| 7,142,042 B1 | 11/2006 | Henry | |
| 7,161,423 B2 | 1/2007 | Paul et al. | |
| 7,167,044 B2 | 1/2007 | Li et al. | |
| 7,187,239 B2 | 3/2007 | Yeh | |
| 7,187,735 B2 | 3/2007 | Kent, III | |
| 7,187,904 B2 | 3/2007 | Gainey et al. | |
| 7,212,788 B2 | 5/2007 | Weber et al. | |
| 7,224,231 B2 | 5/2007 | Wu | |
| 7,260,377 B2 | 8/2007 | Burns et al. | |
| 7,283,851 B2 | 10/2007 | Persico et al. | |
| 7,299,021 B2 | 11/2007 | Parssinen et al. | |
| 7,313,368 B2 | 12/2007 | Wu et al. | |
| 7,317,894 B2 | 1/2008 | Hirose | |
| 7,333,831 B2 | 2/2008 | Srinivasan et al. | |
| 7,356,325 B2 | 4/2008 | Behzad et al. | |
| 7,372,336 B2 | 5/2008 | Lee et al. | |
| 7,403,508 B1 | 7/2008 | Miao | |
| 7,444,166 B2 | 10/2008 | Sahota et al. | |
| 7,454,181 B2 | 11/2008 | Banister et al. | |
| 7,477,106 B2 | 1/2009 | Van Bezooijen et al. | |
| 7,486,135 B2 | 2/2009 | Mu | |
| 7,570,111 B1 | 8/2009 | Vagher et al. | |
| 7,599,675 B2 | 10/2009 | Mu et al. | |
| 7,643,847 B2 | 1/2010 | Daanen et al. | |
| 7,643,848 B2 | 1/2010 | Robinett et al. | |
| 7,697,905 B2 | 4/2010 | Lee et al. | |
| 7,728,664 B2 | 6/2010 | Chang et al. | |
| 7,751,513 B2 | 7/2010 | Eisenhut et al. | |
| 7,764,726 B2 | 7/2010 | Simic et al. | |
| 7,848,724 B2 | 12/2010 | Bult et al. | |
| 7,869,528 B2 | 1/2011 | Robinson | |
| 7,877,075 B1 | 1/2011 | Jin et al. | |
| 7,911,269 B2 | 3/2011 | Yang et al. | |
| 7,944,298 B2 | 5/2011 | Cabanillas et al. | |
| 7,949,309 B2 | 5/2011 | Rofougaran et al. | |
| 7,952,398 B2 | 5/2011 | Salcido et al. | |
| 8,022,772 B2 | 9/2011 | Cassia et al. | |
| 8,055,229 B2 | 11/2011 | Huang | |
| 8,063,706 B2 | 11/2011 | Li et al. | |
| 8,081,672 B2 | 12/2011 | Kent et al. | |
| 8,090,332 B2 | 1/2012 | Sahota et al. | |
| 8,090,369 B2 | 1/2012 | Kitazoe | |
| 8,139,670 B1 | 3/2012 | Son et al. | |
| 8,149,955 B2 | 4/2012 | Tired | |
| 8,195,117 B2 | 6/2012 | Bult et al. | |
| 8,208,887 B2 | 6/2012 | Lee et al. | |
| 8,217,723 B2 | 7/2012 | Rajendran et al. | |
| 8,242,841 B2 | 8/2012 | Zhang | |
| 8,270,927 B2 | 9/2012 | Wallace et al. | |
| 8,290,449 B2 | 10/2012 | Keehr et al. | |
| 8,295,778 B2 | 10/2012 | Kotecha et al. | |
| 8,306,494 B2 | 11/2012 | Ojo | |
| 8,442,473 B1 | 5/2013 | Kaukovuori et al. | |
| 8,514,015 B2 | 8/2013 | Chen | |
| 8,571,510 B2 | 10/2013 | Liu et al. | |
| 8,600,315 B2 | 12/2013 | Roufoogaran et al. | |
| 8,626,084 B2 | 1/2014 | Chan et al. | |
| 8,676,148 B2 | 3/2014 | Ogasawara | |
| 8,706,069 B2 * | 4/2014 | Khoini-Poorfard et al. | 455/266 |
| 2002/0008575 A1 | 1/2002 | Oskowsky et al. | |
| 2002/0061773 A1 | 5/2002 | Adachi et al. | |
| 2002/0111163 A1 | 8/2002 | Hamabe | |
| 2002/0132597 A1 | 9/2002 | Peterzell et al. | |
| 2002/0173337 A1 | 11/2002 | Hajimiri et al. | |
| 2002/0193108 A1 * | 12/2002 | Robinett | 455/427 |
| 2003/0076797 A1 | 4/2003 | Lozano | |
| 2003/0081694 A1 * | 5/2003 | Wieck | 375/316 |
| 2003/0125040 A1 | 7/2003 | Walton et al. | |
| 2003/0148750 A1 | 8/2003 | Yan et al. | |
| 2003/0157915 A1 | 8/2003 | Atkinson et al. | |
| 2003/0176176 A1 | 9/2003 | Leinonen et al. | |
| 2003/0203743 A1 * | 10/2003 | Sugar et al. | 455/550.1 |
| 2003/0206076 A1 | 11/2003 | Hashemi et al. | |
| 2003/0228851 A1 | 12/2003 | Taniguchi | |
| 2004/0087290 A1 | 5/2004 | Schmidt et al. | |
| 2004/0092243 A1 | 5/2004 | Hey-Shipton | |
| 2004/0113746 A1 | 6/2004 | Brindle | |
| 2004/0116086 A1 | 6/2004 | Huttunen | |
| 2004/0121753 A1 | 6/2004 | Sugar et al. | |
| 2004/0204104 A1 | 10/2004 | Horng et al. | |
| 2004/0219959 A1 | 11/2004 | Khayrallah et al. | |
| 2004/0224643 A1 | 11/2004 | Nakai | |
| 2004/0253955 A1 | 12/2004 | Love et al. | |
| 2004/0266356 A1 | 12/2004 | Javor et al. | |
| 2005/0039060 A1 | 2/2005 | Okayasu | |
| 2005/0075077 A1 | 4/2005 | Mach et al. | |
| 2005/0079847 A1 | 4/2005 | Arafa | |
| 2005/0118977 A1 | 6/2005 | Drogi et al. | |
| 2005/0197090 A1 | 9/2005 | Stockstad et al. | |
| 2005/0215264 A1 | 9/2005 | Subramaniam et al. | |

(56) References Cited

U.S. PATENT DOCUMENTS

| | | |
|---|---|---|
| 2005/0231290 A1 | 10/2005 | Hung et al. |
| 2005/0265084 A1 | 12/2005 | Choi |
| 2005/0277387 A1 | 12/2005 | Kojima et al. |
| 2006/0009177 A1 | 1/2006 | Persico et al. |
| 2006/0023745 A1 | 2/2006 | Koo et al. |
| 2006/0061773 A1 | 3/2006 | Lee et al. |
| 2006/0121937 A1 | 6/2006 | Son |
| 2006/0128322 A1 | 6/2006 | Igarashi et al. |
| 2006/0146693 A1 | 7/2006 | Mori et al. |
| 2006/0170503 A1 | 8/2006 | Lee et al. |
| 2006/0189286 A1 | 8/2006 | Kyu et al. |
| 2006/0222100 A1 | 10/2006 | Behzad |
| 2006/0234662 A1 | 10/2006 | Diloisy |
| 2006/0291428 A1 | 12/2006 | Filipovic |
| 2007/0049332 A1 | 3/2007 | Higuchi |
| 2007/0060080 A1 | 3/2007 | Nishimura et al. |
| 2007/0072577 A1 | 3/2007 | Rozenblit et al. |
| 2007/0105517 A1 | 5/2007 | Chang et al. |
| 2007/0142013 A1 | 6/2007 | Bucknor et al. |
| 2007/0177656 A1 | 8/2007 | Maruta et al. |
| 2007/0177693 A1 | 8/2007 | Kluge |
| 2007/0184801 A1 | 8/2007 | Kogawa et al. |
| 2007/0197170 A1 | 8/2007 | Boos |
| 2007/0197178 A1 | 8/2007 | Gu |
| 2007/0197204 A1 | 8/2007 | Herczog et al. |
| 2007/0202890 A1 | 8/2007 | Feher |
| 2007/0242784 A1 | 10/2007 | Sampson et al. |
| 2007/0243832 A1 | 10/2007 | Park et al. |
| 2007/0262817 A1 | 11/2007 | Ciccarelli et al. |
| 2007/0262871 A1 | 11/2007 | Yamagajo et al. |
| 2008/0004078 A1 | 1/2008 | Barratt et al. |
| 2008/0013654 A1 | 1/2008 | Rick et al. |
| 2008/0116976 A1 | 5/2008 | Chang et al. |
| 2008/0117999 A1 | 5/2008 | Kadous et al. |
| 2008/0139151 A1 | 6/2008 | Ojo et al. |
| 2008/0204148 A1 | 8/2008 | Kim et al. |
| 2008/0224770 A1 | 9/2008 | Kim et al. |
| 2008/0224791 A1 | 9/2008 | Cheng |
| 2008/0225971 A1 | 9/2008 | Behzad |
| 2008/0261650 A1 | 10/2008 | Piriyapoksombut et al. |
| 2008/0297259 A1 | 12/2008 | Mu |
| 2009/0124227 A1 | 5/2009 | Ishiguro |
| 2009/0227214 A1 | 9/2009 | Georgantas et al. |
| 2009/0237161 A1 | 9/2009 | Fagg |
| 2009/0243869 A1* | 10/2009 | Sanderford, Jr. ............. 340/657 |
| 2009/0253456 A1 | 10/2009 | Toh et al. |
| 2009/0290659 A1 | 11/2009 | Petrovic et al. |
| 2009/0323779 A1 | 12/2009 | Lennen |
| 2010/0019970 A1 | 1/2010 | Farrokhi et al. |
| 2010/0034094 A1 | 2/2010 | Tenny |
| 2010/0040178 A1 | 2/2010 | Sutton et al. |
| 2010/0041359 A1 | 2/2010 | Liu et al. |
| 2010/0142440 A1 | 6/2010 | Inoue |
| 2010/0195754 A1 | 8/2010 | Li et al. |
| 2010/0197263 A1 | 8/2010 | Dwyer et al. |
| 2010/0210226 A1 | 8/2010 | Matsuyama |
| 2010/0210272 A1 | 8/2010 | Sundstrom et al. |
| 2010/0210299 A1 | 8/2010 | Gorbachov |
| 2010/0214184 A1 | 8/2010 | Tran et al. |
| 2010/0225414 A1 | 9/2010 | Gorbachov |
| 2010/0226327 A1 | 9/2010 | Zhang et al. |
| 2010/0232493 A1 | 9/2010 | Thirumoorthy |
| 2010/0237947 A1 | 9/2010 | Xiong et al. |
| 2010/0253435 A1 | 10/2010 | Ichitsubo et al. |
| 2010/0265875 A1 | 10/2010 | Zhao et al. |
| 2010/0271986 A1 | 10/2010 | Chen |
| 2010/0272051 A1 | 10/2010 | Fu et al. |
| 2010/0301946 A1 | 12/2010 | Borremans |
| 2010/0311378 A1 | 12/2010 | Tasic et al. |
| 2010/0328155 A1 | 12/2010 | Simic et al. |
| 2010/0330977 A1 | 12/2010 | Kadous et al. |
| 2011/0018635 A1 | 1/2011 | Tasic et al. |
| 2011/0044380 A1 | 2/2011 | Marra et al. |
| 2011/0050319 A1 | 3/2011 | Wong |
| 2011/0084791 A1 | 4/2011 | Mun et al. |
| 2011/0086603 A1 | 4/2011 | Toosi et al. |
| 2011/0110463 A1 | 5/2011 | Chang et al. |
| 2011/0122972 A1 | 5/2011 | Lie et al. |
| 2011/0165848 A1 | 7/2011 | Gorbachov et al. |
| 2011/0193625 A1 | 8/2011 | Gatta et al. |
| 2011/0194504 A1 | 8/2011 | Gorokhov et al. |
| 2011/0204973 A1 | 8/2011 | Hu et al. |
| 2011/0211533 A1 | 9/2011 | Casaccia et al. |
| 2011/0217945 A1 | 9/2011 | Uehara et al. |
| 2011/0222443 A1 | 9/2011 | Khlat |
| 2011/0222444 A1 | 9/2011 | Khlat et al. |
| 2011/0242999 A1 | 10/2011 | Palanki et al. |
| 2011/0250926 A1 | 10/2011 | Wietfeldt et al. |
| 2011/0268048 A1 | 11/2011 | Toskala et al. |
| 2011/0268232 A1 | 11/2011 | Park et al. |
| 2011/0292844 A1 | 12/2011 | Kwun et al. |
| 2011/0299434 A1 | 12/2011 | Gudem et al. |
| 2011/0300810 A1 | 12/2011 | Mikhemar et al. |
| 2012/0009886 A1 | 1/2012 | Poulin |
| 2012/0013387 A1 | 1/2012 | Sankaranarayanan et al. |
| 2012/0026862 A1 | 2/2012 | Sadri et al. |
| 2012/0044927 A1 | 2/2012 | Pan et al. |
| 2012/0056681 A1 | 3/2012 | Lee |
| 2012/0057621 A1 | 3/2012 | Hong et al. |
| 2012/0195237 A1* | 8/2012 | Chan et al. .................... 370/278 |
| 2012/0236829 A1* | 9/2012 | Takano et al. ................. 370/331 |
| 2012/0293265 A1 | 11/2012 | Heikkinen et al. |
| 2012/0294299 A1 | 11/2012 | Fernando |
| 2012/0327825 A1 | 12/2012 | Gudem et al. |
| 2012/0329395 A1 | 12/2012 | Husted et al. |
| 2013/0003617 A1 | 1/2013 | Gudem et al. |
| 2013/0003783 A1 | 1/2013 | Gudem et al. |
| 2013/0043946 A1 | 2/2013 | Hadjichristos et al. |
| 2013/0051284 A1 | 2/2013 | Khlat |
| 2013/0114769 A1 | 5/2013 | Fernando |
| 2013/0163492 A1 | 6/2013 | Wong |
| 2013/0217398 A1 | 8/2013 | Winiecki et al. |
| 2013/0230080 A1 | 9/2013 | Gudem et al. |
| 2013/0231064 A1 | 9/2013 | Gudem et al. |
| 2013/0315348 A1 | 11/2013 | Tasic et al. |
| 2013/0316668 A1 | 11/2013 | Davierwalla et al. |
| 2013/0316669 A1 | 11/2013 | Davierwalla et al. |
| 2013/0316670 A1 | 11/2013 | Tasic et al. |
| 2013/0329665 A1 | 12/2013 | Kadous et al. |
| 2014/0072001 A1 | 3/2014 | Chang et al. |
| 2014/0113578 A1 | 4/2014 | Xu |
| 2014/0269853 A1 | 9/2014 | Gudem et al. |

FOREIGN PATENT DOCUMENTS

| | | |
|---|---|---|
| CN | 101228702 A | 7/2008 |
| CN | 101242158 A | 8/2008 |
| CN | 101523967 A | 9/2009 |
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 A | 10/2001 |
| JP | 2002261880 A | 9/2002 |
| JP | 2004015162 A | 1/2004 |
| JP | 2006520143 A | 8/2006 |
| JP | 2007324711 A | 12/2007 |

(56) References Cited

FOREIGN PATENT DOCUMENTS

| | | |
|---|---|---|
| JP | 2008085793 A | 4/2008 |
| JP | 2008519535 A | 6/2008 |
| JP | 2009130867 A | 6/2009 |
| JP | 2011015112 A | 1/2011 |
| JP | 2011082669 A | 4/2011 |
| JP | 2011091747 A | 5/2011 |
| JP | 2011119807 A | 6/2011 |
| WO | 0150636 | 7/2001 |
| WO | 02037686 | 5/2002 |
| WO | 2005039060 | 4/2005 |
| WO | 2005062477 A2 | 7/2005 |
| WO | 2005088847 A1 | 9/2005 |
| WO | 2006050515 A2 | 5/2006 |
| WO | 2006118538 A2 | 11/2006 |
| WO | 2008059257 A1 | 5/2008 |
| WO | 2008084539 A1 | 7/2008 |
| WO | 2008092745 A1 | 8/2008 |
| WO | 2008103757 | 8/2008 |
| WO | 2008145604 A1 | 12/2008 |
| WO | 2010059257 A1 | 5/2010 |
| WO | 2011019850 A1 | 2/2011 |
| WO | 2011050729 A1 | 5/2011 |
| WO | 2011092005 A1 | 8/2011 |
| WO | 2011138697 A1 | 11/2011 |
| WO | 2012008705 A2 | 1/2012 |
| WO | 2012049529 A1 | 4/2012 |
| WO | 2013036794 A1 | 3/2013 |
| WO | 2013131047 | 9/2013 |

OTHER PUBLICATIONS

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.
Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.
Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.
Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.
Chen, et al., "A monolithic 5.9-GHz CMOS I/Q direct-down converter utilizing a quadrature coupler and transformer-coupled subharmonic mixers," Microwave and Wireless Components Letters, IEEE , vol. 16, No. 4, 2006, pp. 197-199.
Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.
Hashemi, et al., "Concurrent Multiband Low-Noise Amplifiers—Theory, Design, and Applications," IEEE Transactions on Microwave Theory and Techniques, vol. 50, No. 1, Jan. 2002.
Henrik M et al., "A Full Duplex Front End Module for WiFi 802.11.n Applications", European Microwave Association, vol. 12, No. 4, Oct. 2008, pp. 162-165.
Hwang, et al., "A High IIP2 Direct-Conversion Receiver using Even-Harmonic Reduction Technique for Cellular CDMA/PCS/GPS applications," IEEE Transaction on Circuits and Systems.
International Search Report and Written Opinion—PCT/US2013/035526—ISA/EPO—Jul. 7, 2013.
Jones W. W., et al., "Narrowband interference suppression using filter-bank analysis/synthesis techniques", Military Communications Conference, 1992. MILC0M '92, Conference REC0R D. Communications—Fusing Command, Control and Intelligence., IEEE San Diego, CA, USA, Oct. 11-14, 1992, New York, NY, USA, IEEE, US, Oct. 11, 1992, pp. 898-902, XP010060840, DOI: 10.1109/MILCOM.1992.243977, ISBN: 978-0-7803-0585-4.
Jussi R et al., "A Dual-Band RF Front-End for WCDMA and GSM Applications", IEEE, Journal Solid-State Circuits, 2001, vol. 36, No. 8, pp. 1198-1204.
Kevin W et al., "3G/4G Multimode Cellular Front End Challenges", Part 2: Architecture Discussion, RFMD® White Paper, 9 pages.
Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.
Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.
Lee et al., "Development of Miniature Quad SAW filter bank based on PCB substrate", IEEE Intl Frequency Control Symp, pp. 146-149, 2007.
MSM6000 Chipset Solution, Qualcomm Incorporated.
MSM6500 Chipset Solution, Qualcomm Incorporated.
Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.
Qualcomm Europe: "UE Implementation Impact due to 4C-HSDPA Operation", 3GPP Draft; R1-094067_UE_IMPL_IMPACT_4C_HSDPA, 3rd Generation Partnership Project (3GPP), Mobile Competence Centre ; 650, Route Des Luci0les ; F-06921 Sophia-Antip0lis Cedex ; France, No. Miyazaki; Oct. 12, 2009, XP050388547, [retrieved on Oct. 6, 2009].
Rahn D.G., et al., "A fully integrated multiband MIMO WLAN transceiver RFIC," IEEE J. Solid-State Circuits, 2005, vol. 40 (8), 1629-1641.
Sever et al. "A Dual-Antenna Phase-Array Ultra-Wideband CMOS Transceiver". IEEE Communications Magazine [Online] 2006, vol. 44, Issue 8, pp. 102-110. See pp. 104-107.
Tasic A. et al., "Design of Adaptive Multimode RF Front-End Circuits", IEEE Journal of Solid-State Circuits, vol. 42, Issue 2, Feb. 2007 pp. 313-322.
"UMTS Picocell Front End Module", CTS Corp. 8 pages.
Winternitz, et al., "A GPS Receiver for High-Altitude Satellite Navigation," IEEE Journal of Selected Topics in Signal Processing, vol. 3, No. 4, pp. 541-556, Aug. 2009.

* cited by examiner

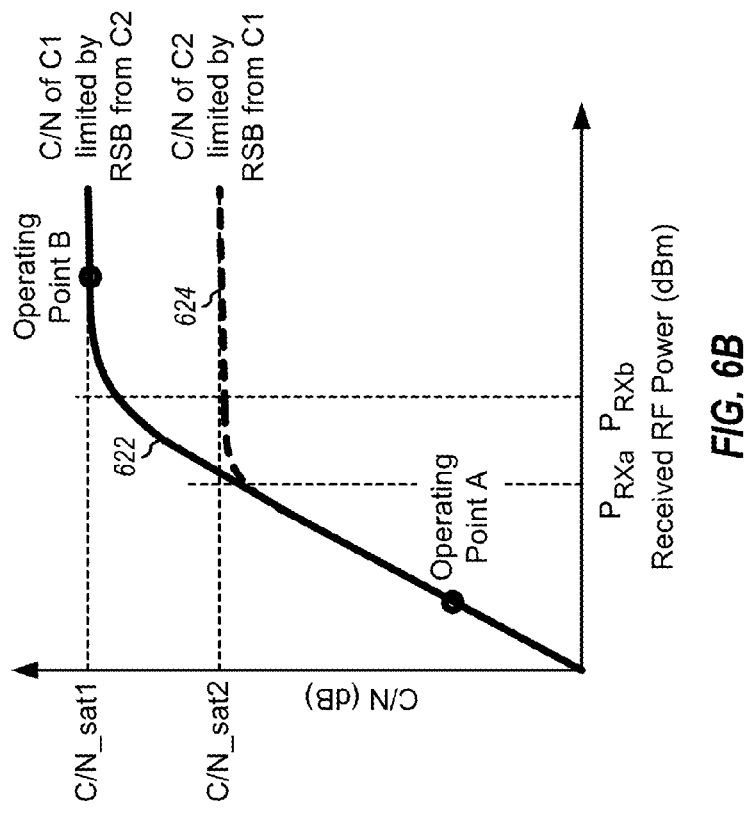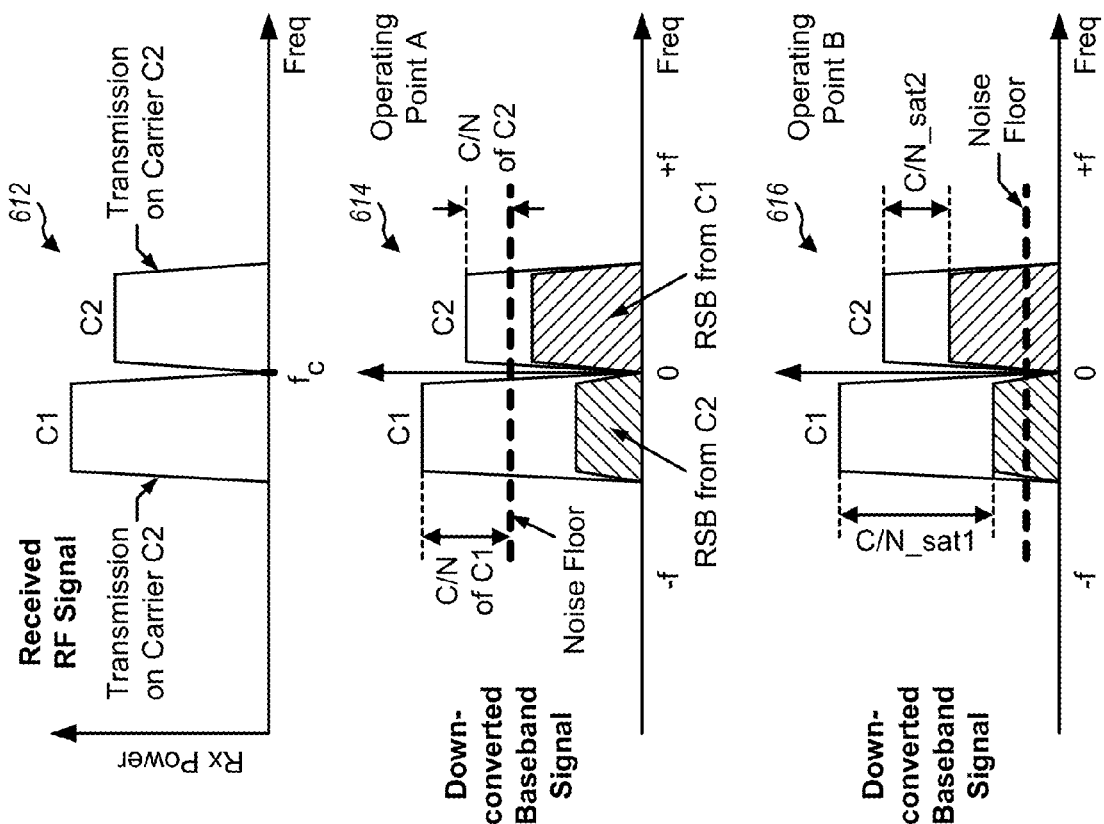
FIG. 6B
FIG. 6A

RECEIVER FOR IMBALANCED CARRIERS

CLAIM OF PRIORITY UNDER 35 U.S.C. §119

The present Application for Patent claims priority to Provisional Application Ser. No. 61/621,124, entitled "IMBALANCED CARRIER RECEIVER," filed Apr. 6, 2012, assigned to the assignee hereof, and expressly incorporated herein by reference.

BACKGROUND

I. Field

The present disclosure relates generally to electronics, and more specifically to a receiver.

II. Background

A user equipment (UE) (e.g., a cellular phone or a smartphone) in a wireless communication system may transmit and receive data for two-way communication. The UE may include a transmitter for data transmission and a receiver for data reception. For data transmission, the transmitter may modulate a radio frequency (RF) carrier signal with data to obtain a modulated RF signal, amplify the modulated RF signal to obtain an output RF signal having the proper output power level, and transmit the output RF signal via an antenna to a base station. For data reception, the receiver may obtain an input RF signal via the antenna and may amplify and process the input RF signal to recover data sent by the base station.

A UE may support carrier aggregation, which is simultaneous operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. It is desirable to receive data on multiple carriers such that good performance can be achieved.

BRIEF DESCRIPTION OF THE DRAWINGS

FIG. 6A shows downconversion of transmissions on two imbalanced carriers.

FIG. 6B shows C/N versus received RF power for transmissions on two imbalanced carriers.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Techniques for using one or multiple downconverters to receive multiple transmissions sent on multiple carriers at different frequencies are disclosed herein. These techniques can provide good performance even when the carriers are imbalanced. These techniques may be used for various types of electronic devices such as wireless communication devices.

Figure 1:
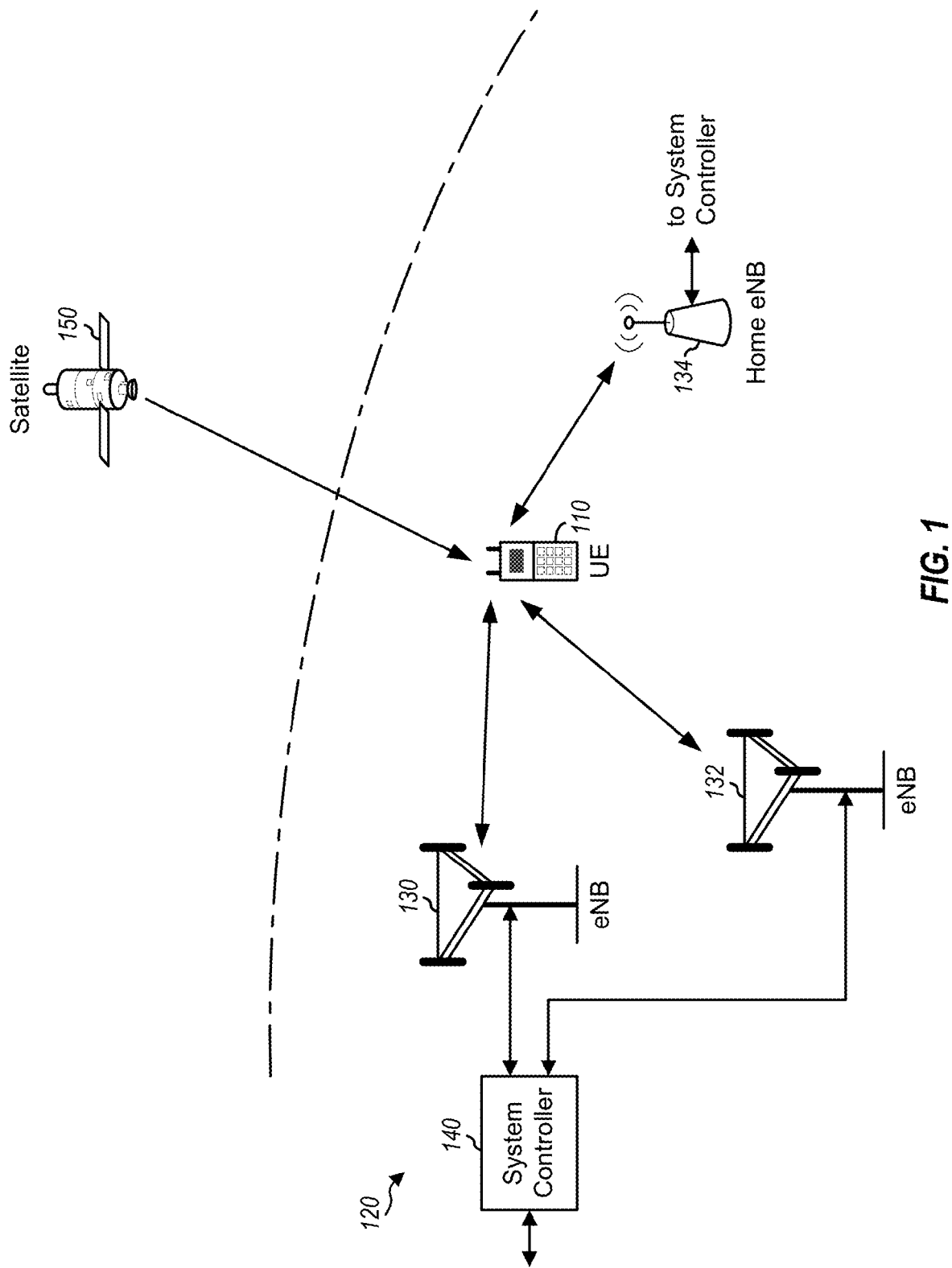
FIG. 1 shows a UE communicating with a wireless communication system.

FIG. 1 shows a UE 110 communicating with a wireless communication system 120. Wireless system 120 may be a Long Term Evolution (LTE) system, a Code Division Multiple Access (CDMA) system, a Global System for Mobile Communications (GSM) system, or some other wireless system. A CDMA system may implement Wideband CDMA (WCDMA), cdma2000, or some other version of CDMA. For simplicity, FIG. 1 shows wireless system 120 including three evolved Node Bs (eNBs) 130, 132 and 134 and one system controller 140. An eNB is an entity that communicates with the UEs and may also be referred to as a base station, a Node B, an access point, etc.

In general, a wireless system may include any number of eNBs and any set of network entities. A wireless system may also include eNBs of different types such as macro eNBs, pico eNBs, home eNBs, etc. A macro eNB may cover a relatively large geographic area (e.g., several kilometers in radius) and may allow unrestricted access by UEs with service subscription. A pico eNB may cover a relatively small geographic area and may allow unrestricted access by UEs with service subscription. A home eNB (HeNB) may cover a relatively small geographic area (e.g., a home) and may allow restricted access by UEs having association with the HeNB. In the example shown in FIG. 1, wireless system 120 may include a macro eNB 130, a pico eNB 132, and a HeNB 134. Each eNB may support one or more cells. The term "cell" can refer to a coverage area of an eNB and/or an eNB subsystem serving the coverage area, depending on the context in which the term is used. A wireless system may also include relays, remote radio heads (RRHs), etc.

UE 110 may also be referred to as a wireless device, a mobile station, a terminal, an access terminal, a subscriber unit, a station, etc. UE 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. UE 110 may be capable of communicating with wireless system 120 and/or other wireless systems. UE 110 may also be capable of receiving signals from broadcast stations (not shown in FIG. 1), signals from satellites (e.g., a satellite 150) in one or more global navigation satellite systems (GNSS), etc. UE 110 may support one or more radio technologies for wireless communication such as LTE, cdma2000, WCDMA, GSM, 802.11, GPS, etc.

UE 110 may support carrier aggregation, which is operation on multiple carriers. Carrier aggregation may also be referred to as multi-carrier operation. UE 110 may be able to operate in low-band from 698 to 960 megahertz (MHz), mid-band from 1475 to 2170 MHz, and/or high-band from 2300 to 2690 and 3400 to 3800 MHz. Low-band, mid-band, and high-band refer to three groups of bands (or band groups), with each band group including a number of frequency bands (or simply, "bands"). LTE Release 11 supports 35 bands, which are referred to as LTE/UMTS bands and are listed in 3GPP TS 36.101. Each band may cover up to 200 MHz and may include one or more carriers. Each carrier may cover up to 20 MHz in LTE and may include a number of subcarriers. The subcarriers for each carrier may be obtained with orthogonal frequency division multiplexing (OFDM) for the downlink in LTE or with single-carrier frequency division multiplexing (SC-FDM) for the uplink in LTE. UE 110 may be configured with up to 5 carriers in one or two bands in LTE Release 11.

Figure 2:
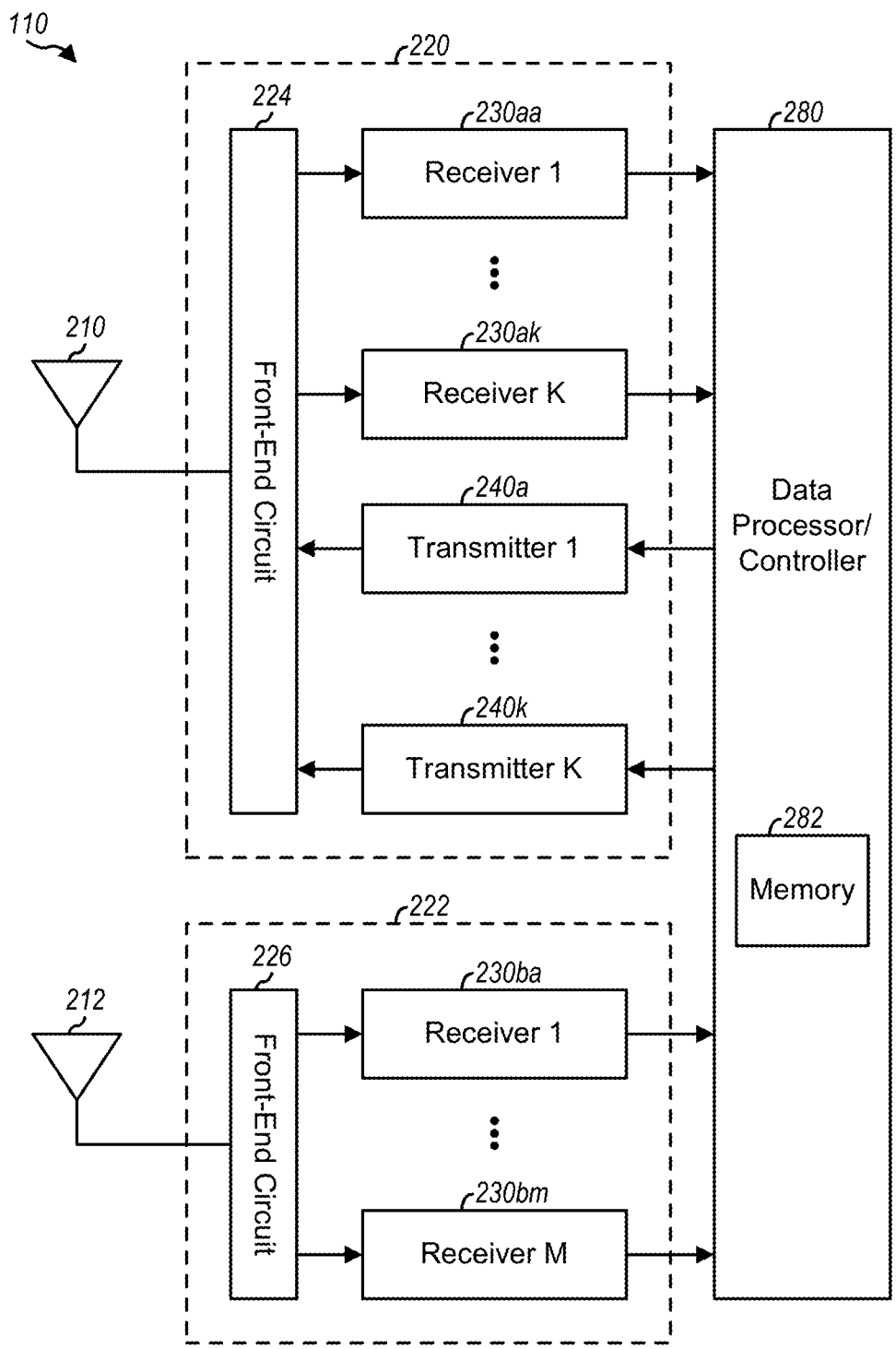
FIG. 2 shows a block diagram of the UE in FIG. 1.

FIG. 2 shows a block diagram of an exemplary design of UE 110 in FIG. 1. In this exemplary design, UE 110 includes a transceiver 220 coupled to a primary antenna 210, receivers 222 coupled to a secondary antenna 212, and a data processor/controller 280. Transceiver 220 includes a front-end circuit 224, multiple (K) receivers 230aa to 230ak, and multiple (K) transmitters 240a to 240k to support multiple bands, carrier aggregation, multiple radio technologies, etc. Receivers 222 include a front-end circuit 226 and multiple (M) receivers 230ba to 230bm to support multiple bands, carrier aggregation, multiple radio technologies, receive diversity, multiple-input multiple-output (MIMO) transmission, etc.

For data reception, antenna 210 may receive signals from one or more eNBs and/or other transmitting stations and may provide a received RF signal to front-end circuit 224. Front-end circuit 224 may route and possibly filter the received RF signal and may provide an input RF signal to a selected receiver 230. Front-end circuit 224 may include one or more switches, duplexers, diplexers, directional couplers, etc. The selected receiver 230 may amplify, filter, and downconvert the input RF signal from front-end circuit 224 and provide a baseband signal to data processor 280. Each receiver 230 in transceiver 220 and each receiver 230 in receivers 222 may operate in similar manner when selected/enabled for use. Each receiver 230 may include one or more amplifiers, filters, downconverters, matching circuits, etc.

For data transmission, data processor 280 may process (e.g., encode and modulate) data to be transmitted and provide an analog output signal to a selected transmitter 240. The selected transmitter 240 may amplify, filter, and upconvert the analog output signal and provide an output RF signal to front-end circuit 224. Each transmitter 240 in transceiver 220 may operate in similar manner when selected/enabled for use. Each transmitter 240 may include one or more amplifiers, filters, upconverters, impedance matching circuits, etc. The output RF signal may be routed through front-end circuit 224 and transmitted via antenna 210.

Each receiver 230 may be implemented as described below. Each transmitter 240 may be implemented in various manners known by one skilled in the art. All or a portion of transceiver 220 and receivers 222 may be implemented on one or more analog integrated circuits (ICs), RF ICs (RFICs), mixed-signal ICs, etc.

Data processor/controller 280 may perform various functions for UE 110. For example, data processor 280 may perform processing for data being received via receivers 230 and data being transmitted via transmitters 240. Controller 280 may control the operation of front-end circuits 224 and 226, receivers 230, and transmitters 240. A memory 282 may store program codes and data for data processor/controller 280. Data processor/controller 280 may be implemented on one or more application specific integrated circuits (ASICs) and/or other ICs.

UE 110 may receive multiple transmissions sent by one or more eNBs on multiple carriers at different frequencies for carrier aggregation. The multiple transmissions may be sent at the same or different transmit power levels and may experience different channel conditions. Hence, the multiple transmissions may be received at different power levels by UE 110. Imbalanced carriers refers to a condition in which the difference between the received powers of multiple transmissions on different carriers exceeds a predetermined amount, e.g., 6 decibels (dB) or some other amount.

Figure 3A:
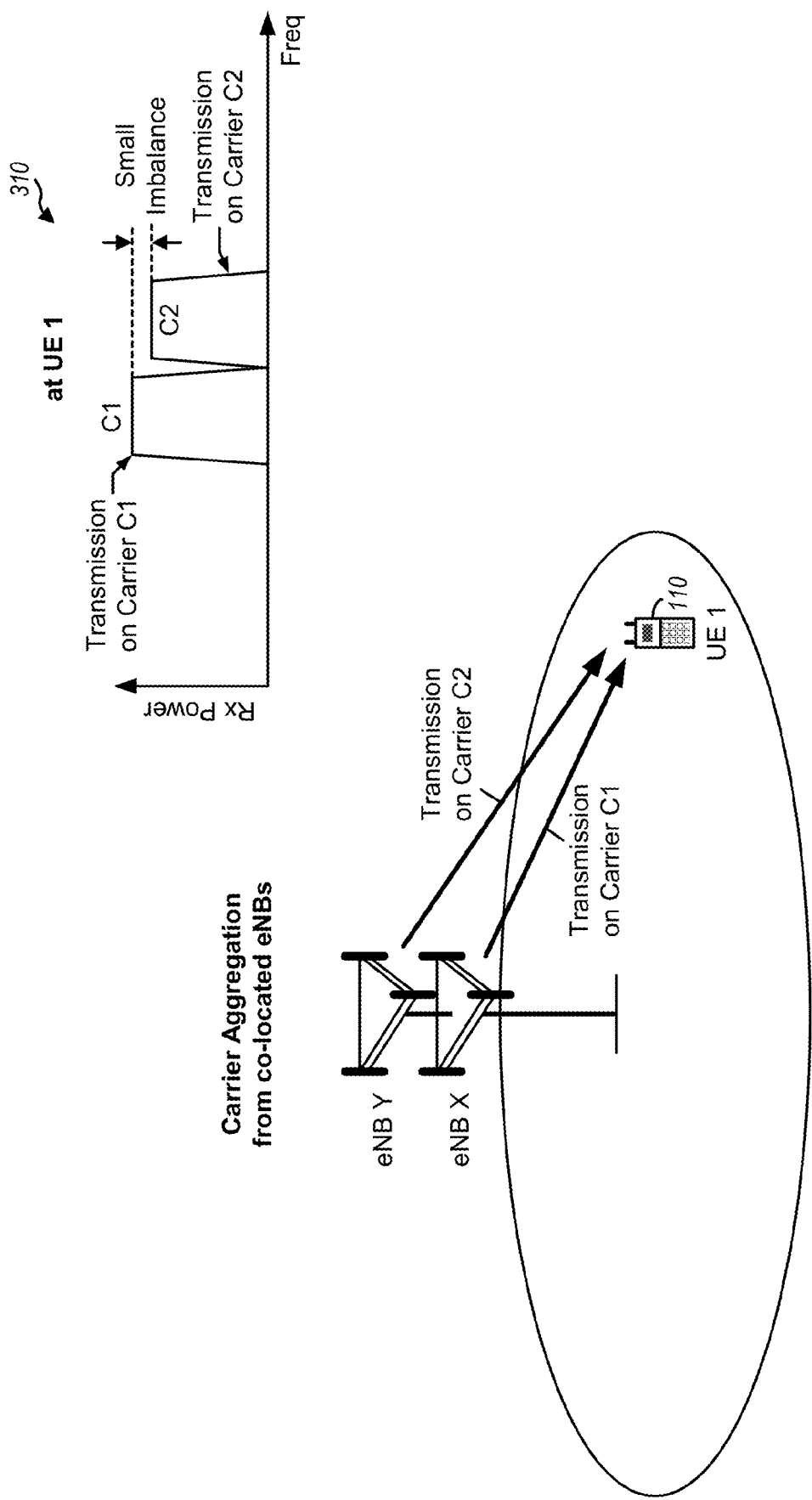
FIGS. 3A and 3B show carrier aggregation from two base stations.

FIG. 3A shows an example of carrier aggregation from two co-located eNBs X and Y, which may be two macro eNBs operating on different sets of carriers. In the example shown in FIG. 3A, eNB X sends a first transmission on a first carrier C1 to UE 110 and, concurrently, eNB Y sends a second transmission on a second carrier C2 to UE 110. Carriers C1 and C2 may be adjacent to each other in frequency (as shown in FIG. 3A) or may be non-contiguous. The first and second transmissions may be sent at the same transmit power level. However, the two transmissions may be received at different power levels at UE 110 due to fading and/or other phenomena. Fading refers to a phenomenon in which signal components at certain frequencies add destructively at a receiver. As shown by illustration 310, the imbalance between the received (Rx) power of the first transmission on carrier C1 and the received power of the second transmission on carrier C2 at UE 110 may be relatively small, e.g., less than 6 dB.

Figure 3B:
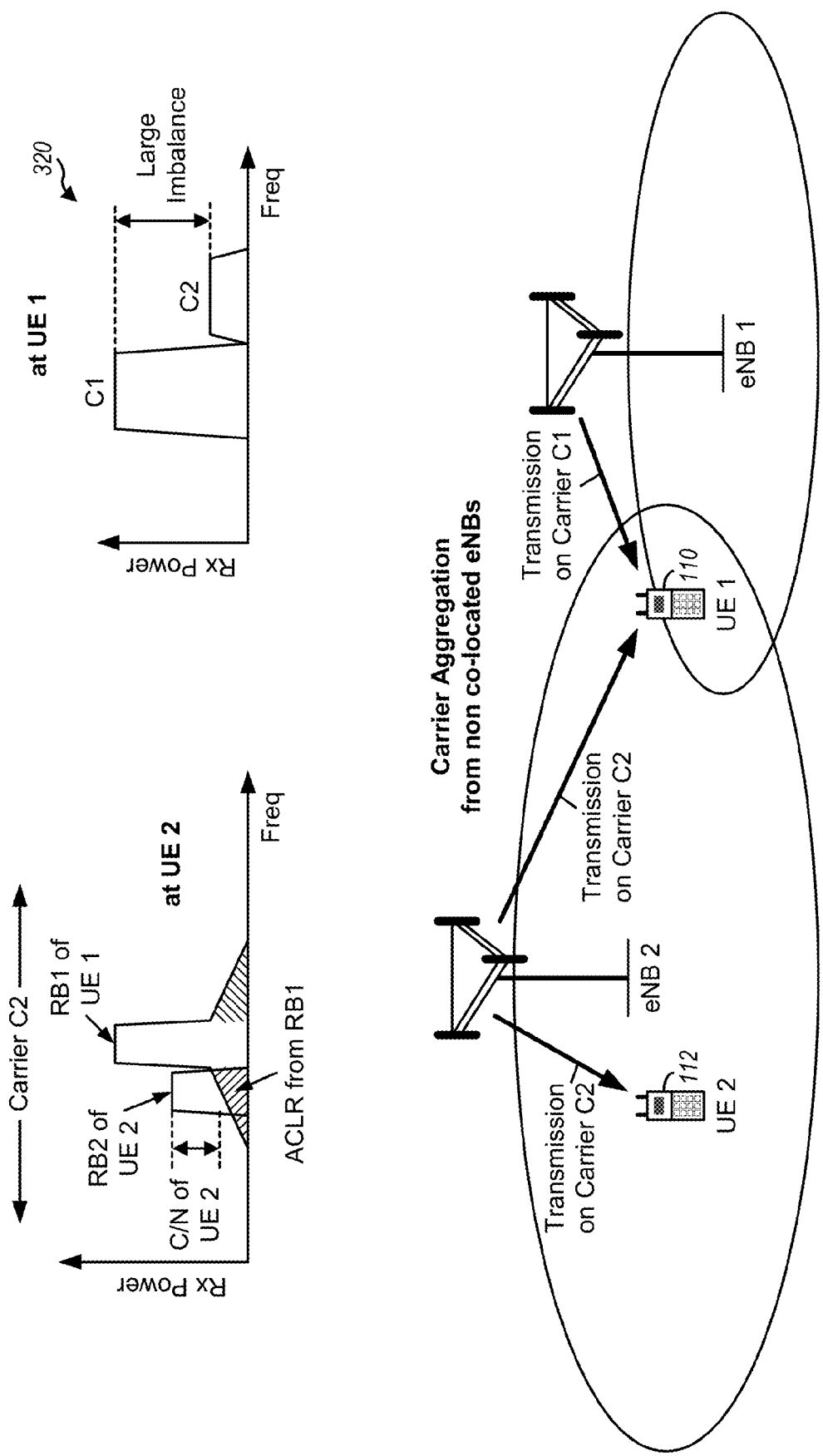

FIG. 3B shows an example of carrier aggregation from two non co-located eNBs 1 and 2. In one scenario, eNBs 1 and 2 may be two macro eNBs with overlapping coverage areas. In another scenario, eNB 2 may be a macro eNB, and eNB 1 may be a pico eNB, a HeNB, an RRH, a repeater, etc.

In the example shown in FIG. 3B, eNB 1 sends a first transmission on a first carrier C1 to UE 110 and, concurrently, eNB 2 sends a second transmission on a second carrier C2 to UE 110. Carriers C1 and C2 may be adjacent to each other in frequency (as shown in FIG. 3B) or may be non-contiguous. The first and second transmissions may be sent at the same or different transmit power levels. The two transmissions may observe different channel conditions and may be received at different power levels at UE 110. For example, UE 110 may be located much closer to eNB 1 than eNB 2 and may have much lower pathloss for eNB 1 than eNB 2. Hence, UE 110 may receive the first transmission from eNB 1 at a much higher power level than the second transmission from eNB 2 due to the much lower pathloss for eNB 1. In general, the difference between the received powers of the two transmissions on carriers C1 and C2 may be due to difference in transmit power and/or difference in channel conditions (e.g., different fading and pathloss) observed by the two transmissions. As shown by illustration 320, the imbalance between the received power of the first transmission on carrier C1 and the received power of the second transmission on carrier C2 at UE 110 may be relatively large, e.g., more than 6 dB.

eNB 2 may serve both UEs 110 and 112, which may be allocated adjacent sets of subcarriers within carrier C2. For example, UE 110 may be allocated a first set of subcarriers in a first resource block (RB1) within carrier C2, and UE 112 may be allocated a second set of subcarriers in a second resource block (RB2) within carrier C2. eNB 2 may send the second transmission on the first set of subcarriers to UE 110. The second transmission may result in undesired signal components appearing on both sides of the first set of subcarriers due to third order nonlinearity of a transmitter within eNB 2, which may be referred to as adjacent channel leakage ratio (ACLR). The undesired signal components may act as interference to transmissions sent on subcarriers on both sides of the first set of subcarriers. The magnitude of the interference may be dependent on the transmit power level of the second transmission to UE 110. UE 112 may observe poor C/N due to the interference from the second transmission to UE 110. Using higher transmit power for the second transmission to UE 110 would result in higher interference to UE 112. Hence, eNB 2 may be unable to increase the transmit power of the second transmission to UE 110 to compensate for imbalance in received powers of the first and second transmissions at UE 110. In this case, UE 110 may be stuck with carrier imbalance and no help from eNB 2.

Figure 4:
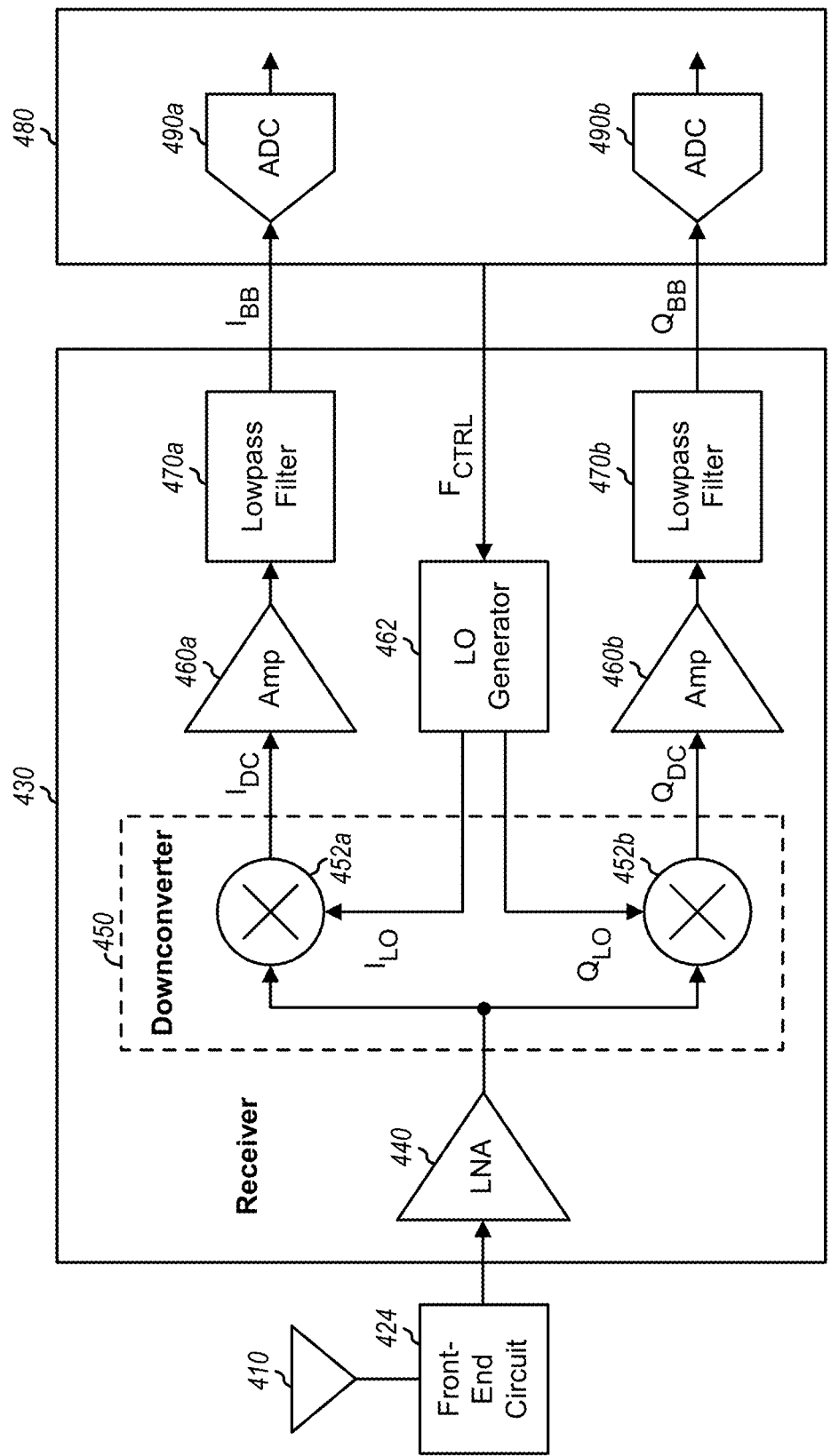
FIG. 4 shows a block diagram of a receiver with a single downconverter.

FIG. 4 shows a block diagram of an exemplary design of a receiver 430, which may be used for any one of receivers 230 in FIG. 2. An antenna 410 receives downlink signals transmitted by eNBs and/or other transmitting stations and provides a received RF signal. A front-end circuit 424 routes and/or filters the received RF signal and provides an input RF signal to receiver 430. Antenna 410 and front-end circuit 424 may correspond to antenna 210 and front-end circuit 224, respectively, or may correspond to antenna 212 and front-end circuit 226, respectively, in FIG. 2.

Within receiver 430, a low noise amplifier (LNA) 440 receives and amplifies the input RF signal and provides an amplified RF signal. A downconverter 450 downconverts the amplified RF signal from RF to baseband and provides an inphase downconverted signal ($I_{DC}$) and a quadrature downconverted signal ($Q_{DC}$). Within downconverter 450, a mixer 452a receives and downconverts the amplified RF signal with an inphase local oscillator (LO) signal ($I_{LO}$) from an LO generator 462 and provides the $I_{DC}$ signal. A mixer 452b receives and downconverts the amplified RF signal with a quadrature LO signal ($Q_{LO}$) from LO generator 462 and provides the $Q_{DC}$ signal. LO generator 462 generates the $I_{LO}$ and $Q_{LO}$ signals at the proper frequency based on a frequency control ($F_{CTRL}$) from data processor 280, which is one exemplary design of data processor 280 in FIG. 2. The $I_{DC}$ signal from mixer 452a is amplified by an amplifier (Amp) 460a and further filtered by a lowpass filter 470a to generate an inphase baseband signal ($I_{BB}$). Similarly, the $Q_{DC}$ signal from mixer 452b is amplified by an amplifier 460b and further filtered by a lowpass filter 470b to generate a quadrature baseband signal ($Q_{BB}$). The bandwidth of lowpass filters 470a and 470b may be configurable and may be set based on the bandwidth of a desired signal being received. Receiver 430 provides the $I_{BB}$ and $Q_{BB}$ signals to data processor 480.

Mixer 452a, amplifier 460a, and lowpass filter 470a are part of an inphase (I) branch of receiver 430. Mixer 452b, amplifier 460b, and lowpass filter 470b are part of a quadrature (Q) branch of receiver 430. For an ideal receiver, the I branch should be in quadrature (or 90° out of phase) with respect to the Q branch, and the two branches should have equal gain across frequency. However, I/Q imbalances typically exist between the I and Q branches and may include gain imbalance and/or phase error. I/Q imbalances result in residual sideband (RSB), which is distortion that falls on nearby frequencies, as described below.

Within data processor 480, an analog-to-digital converter (ADC) 490a receives and digitizes the $I_{BB}$ signal and provide I ADC samples. An ADC 490b receives and digitizes the $Q_{BB}$ signal and provide Q ADC samples. The ADC samples are digitally processed (e.g., demodulated and decoded) to recover data sent to UE 110.

Figure 5B:
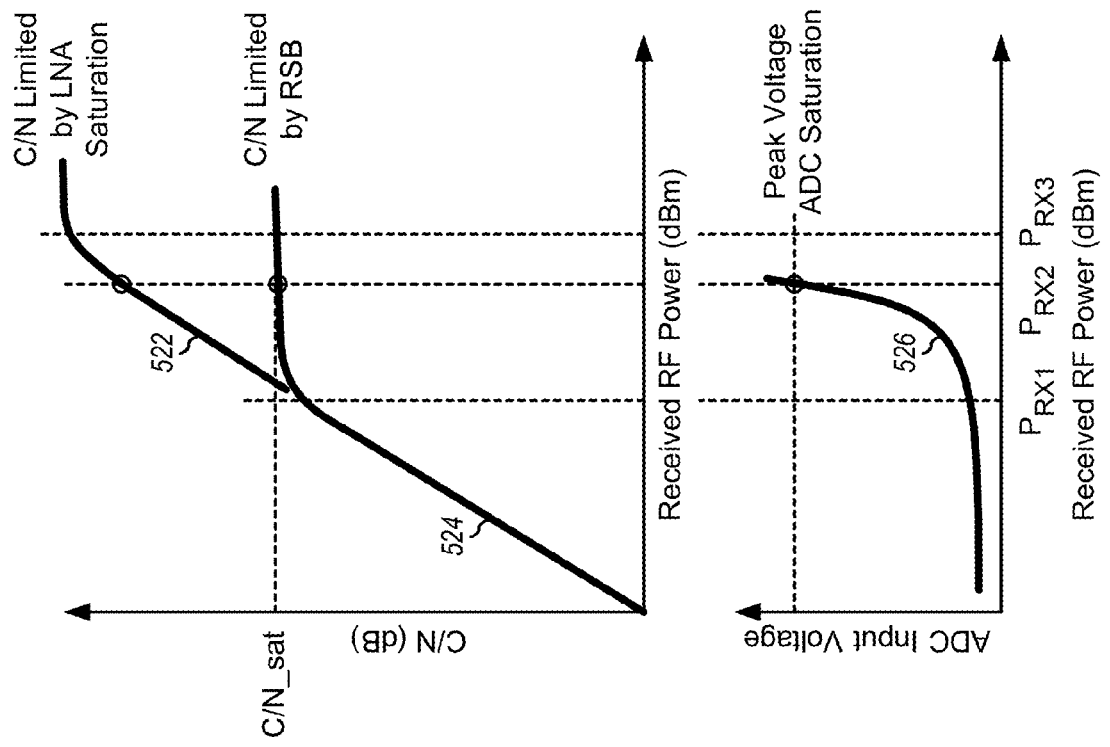
FIG. 5B shows carrier-to-noise ratio (C/N) versus received RF power for transmissions on two balanced carriers.
Figure 5A:
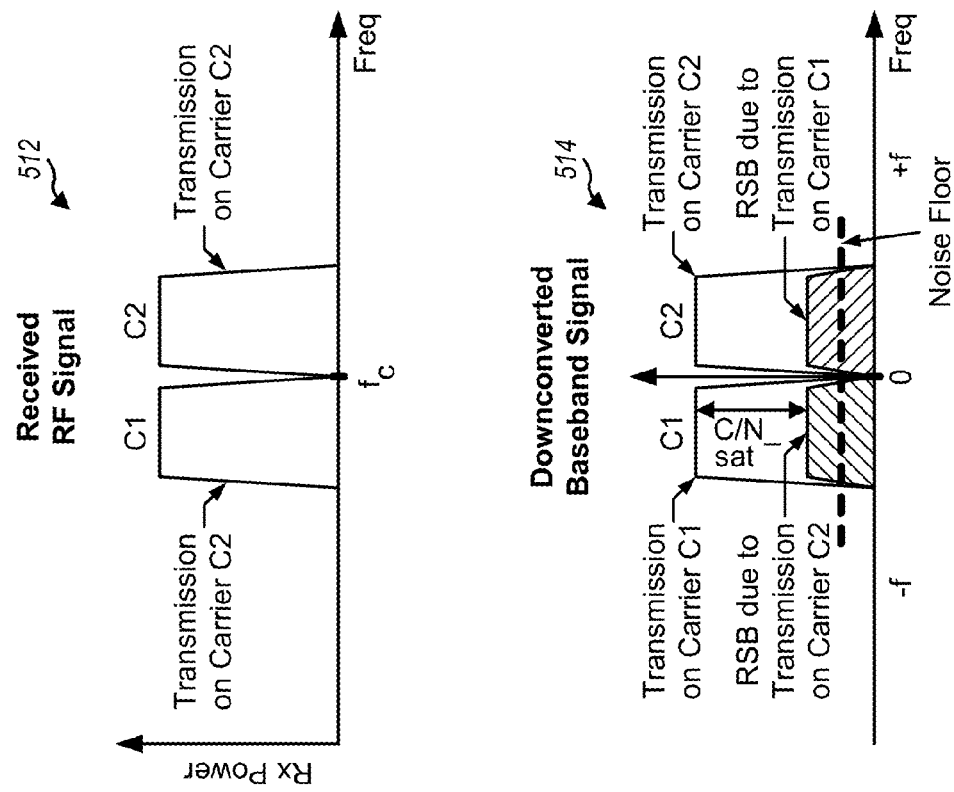
FIG. 5A shows downconversion of transmissions on two balanced carriers.

FIG. 5A shows downconversion of two transmissions on two balanced carriers C1 and C2 using receiver 430 in FIG. 4. An illustration 512 shows a received RF signal from antenna 410. The received RF signal includes two transmissions on two carriers C1 and C2, which are centered at a frequency of $f_c$. The two transmissions are received at approximately the same received power level with balanced carriers. The input RF signal provided to LNA 440 may have a similar spectrum as the received RF signal.

An illustration 514 shows the baseband signals from receiver 430. The received RF signal is downconverted with an LO signal at a frequency of $f_c$, which results in the two transmissions on carriers C1 and C2 being centered at direct current (DC) or 0 Hertz. As shown by illustration 514, I/Q imbalances in receiver 430 results in (i) the transmission on carrier C1 causing RSB that appears on carrier C2 and (ii) the transmission on carrier C2 causing RSB that appears on carrier C1. The RSB from the transmission on carrier C1 acts as noise/interference to the transmission on carrier C2, and vice versa. The amplitude of the RSB is dependent on the received power level of the transmission causing the RSB as well as the amount of I/Q imbalances in receiver 430. Receiver 430 has a noise floor ($N_{RX}$), which is determined by thermal noise and a noise figure (NF) of receiver 430. The RSB may be larger than the noise floor at receiver 430. In this case, the C/N of the transmission on each carrier may be limited by the RSB due to the transmission on the other carrier.

FIG. 5B shows the performance of receiver 430 in FIG. 4. In FIG. 5B, the horizontal axis represents the received power at the antenna port, or received RF power. The upper half of FIG. 5B shows C/N (in units of dB) versus received RF power (in units of dBm). A plot 522 shows C/N of the amplified RF signal at the output of LNA 440 versus received RF power. As shown by plot 522, the C/N of the amplified RF signal increases linearly with higher received RF power until LNA 440 saturates at a received RF power of $P_{RX3}$. For received RF power less than $P_{RX3}$, distortion due to LNA nonlinearity is less than the noise floor at receiver 430, and C/N increases with higher received RF power. For received RF power greater than $P_{RX3}$, distortion due to LNA nonlinearity is above the noise floor and increases with higher received RF power. Hence, C/N approaches a certain maximum value for received RF power higher than $P_{RX3}$.

A plot 524 shows C/N of the baseband signals at the output of receiver 430 versus received RF power. As shown by plot 524, the C/N of the baseband signals increases linearly with higher received RF power until RSB from another carrier exceeds the noise floor, which occurs at a received RF power of $P_{RX1}$. For received RF power less than $P_{RX1}$, RSB is less than the noise floor, and C/N increases with higher received RF power. For received RF power greater than $P_{RX1}$, RSB is above the noise floor and increases with higher received RF power. Hence, received RF power higher than $P_{RX1}$ results in larger baseband signals but also larger RSB, thereby causing C/N to approach a maximum value of C/N_sat, which is a saturated C/N. C/N_sat is a ratio of received power of a given transmission to received power of RSB caused by other transmissions. C/N_sat is dependent on the amount of I/Q imbalances in receiver 430.

The lower half of FIG. 5B shows ADC input voltage (in units of Volts) versus received RF power (in units of dBm). A plot 526 shows the ADC input voltage increasing as a square function of received RF power until an ADC saturation point is reach at a received RF power of $P_{RX2}$. Received RF power higher than $P_{RX2}$ results in clipping of the baseband signals by ADCs 490, which would degrade performance.

As shown in FIG. 5B, C/N saturation due to RSB occurs first for received RF power exceeding $P_{RX1}$. ADC saturation occurs next for received RF power exceeding $P_{RX2}$. LNA linearity is typically better and does not cause C/N to saturate until the received RF power is much higher than $P_{RX1}$. FIG. 5B shows that addressing RSB may improve C/N, which may in turn improve performance of data transmission.

FIG. 6A shows downconversion of two transmissions on two imbalanced carriers C1 and C2 using receiver 430 in FIG. 4. An illustration 612 shows the received RF signal from antenna 410. The received RF signal includes two transmissions on two carriers C1 and C2, which are centered at a frequency of $f_c$. The two transmissions on carriers C1 and C2 are received at different received power levels of $P_{C1}$ and $P_{C2}$ with imbalanced carriers.

Illustrations 614 and 616 show the baseband signals from receiver 430. The received RF signal is downconverted such that the two transmissions on carriers C1 and C2 are centered at DC. As shown by illustrations 614 and 616, I/Q imbalances in receiver 430 results in (i) the transmission on carrier C1 causing RSB that appears on carrier C2 at a power level of $P_{RSB1}=P_{C1}-SRR$ and (ii) the transmission on carrier C2 causing RSB that appears on carrier C1 at a power level of $P_{RSB2}=P_{C2}-SRR$, where SRR is a ratio of received power of a transmission to received power of RSB due to the transmission. Illustration 614 shows the case in which the RSBs for carriers C1 and C2 are below the noise floor at receiver 430. Illustration 616 shows the case in which the RSBs are above the noise floor. As shown by illustration 616, the C/N of carrier C1 saturates at C/N_sat1 and the C/N of carrier C2 saturates at C/N_sat2, when the RSBs are above the noise floor. This is because increasing the power levels of carriers C1 and C2 would also increase the power levels of the RSBs by approximately the same amount, thereby resulting in little or no improvement in C/N.

FIG. 6B shows C/N of the baseband signals from receiver 430 versus received RF power for the two transmissions on two imbalanced carriers C1 and C2 shown in FIG. 6A. A plot 624 shows C/N of the baseband signals for the transmission on carrier C1 versus received RF power. A plot 624 shows C/N of the baseband signals for the transmission on carrier C2 versus received RF power.

When the received RF power is sufficiently low (e.g., at point A in plots 622 and 624), the RSBs due to the two transmissions on carriers C1 and C2 are below the noise floor, as shown by illustration 614 in FIG. 6A. In this case, the C/N of the transmission on each carrier is dependent on the received power of that transmission and the noise floor, as follows:

$$(C/N)_{Cx}=P_{Cx}-N_{RX} \text{ for } Cx \in \{C1,C2\}, \quad \text{Eq (1)}$$

where $(C/N)_{Cx}$ is the C/N of carrier Cx.

When the received RF power is higher (e.g., at point B in plot 622), the RSBs due to the two transmissions on carriers C1 and C2 are above the noise floor, as shown by illustration 616 in FIG. 6A. In this case, the C/N of the transmission on each carrier is dependent on the received power of that transmission as well as the RSB due to the transmission on the other carrier, as follows:

$$(C/N)_{C1}=P_{C1}-P_{RSB2}, \text{ and} \quad \text{Eq (2)}$$

$$(C/N)_{C2}=P_{C2}-P_{RSB1}, \quad \text{Eq (3)}$$

where $P_{RSB1}$ and $P_{RSB2}$ are received power of RSBs due to transmissions on carriers C1 and C2, respectively.

As shown by illustration 616 in FIG. 6A, the C/N of the weaker transmission on carrier C2 may be substantially degraded by the RSB due to the stronger transmission on carrier C1. The amount of degradation of the C/N of the weaker transmission may be dependent on the amount of imbalance between the two carriers, which may be given as $(P_{C1}-P_{C2})$. Degradation of C/N due to RSB, especially when the amount of imbalance between carriers is large, may substantially degrade the performance of data transmission.

In an aspect of the present disclosure, one or multiple downconverters may be used to receive multiple transmissions sent on multiple carriers. The number of downconverters to use may be selected base on one or more criteria such as the amount of imbalance between the multiple carriers, the received RF power at a UE, the received power of interfering transmissions having RSBs causing interference to desired transmissions, etc. Multiple downconverters may be used to avoid a scenario in which RSB from a stronger transmission degrades the C/N of a weaker transmission at the UE, as described below.

Figure 7:
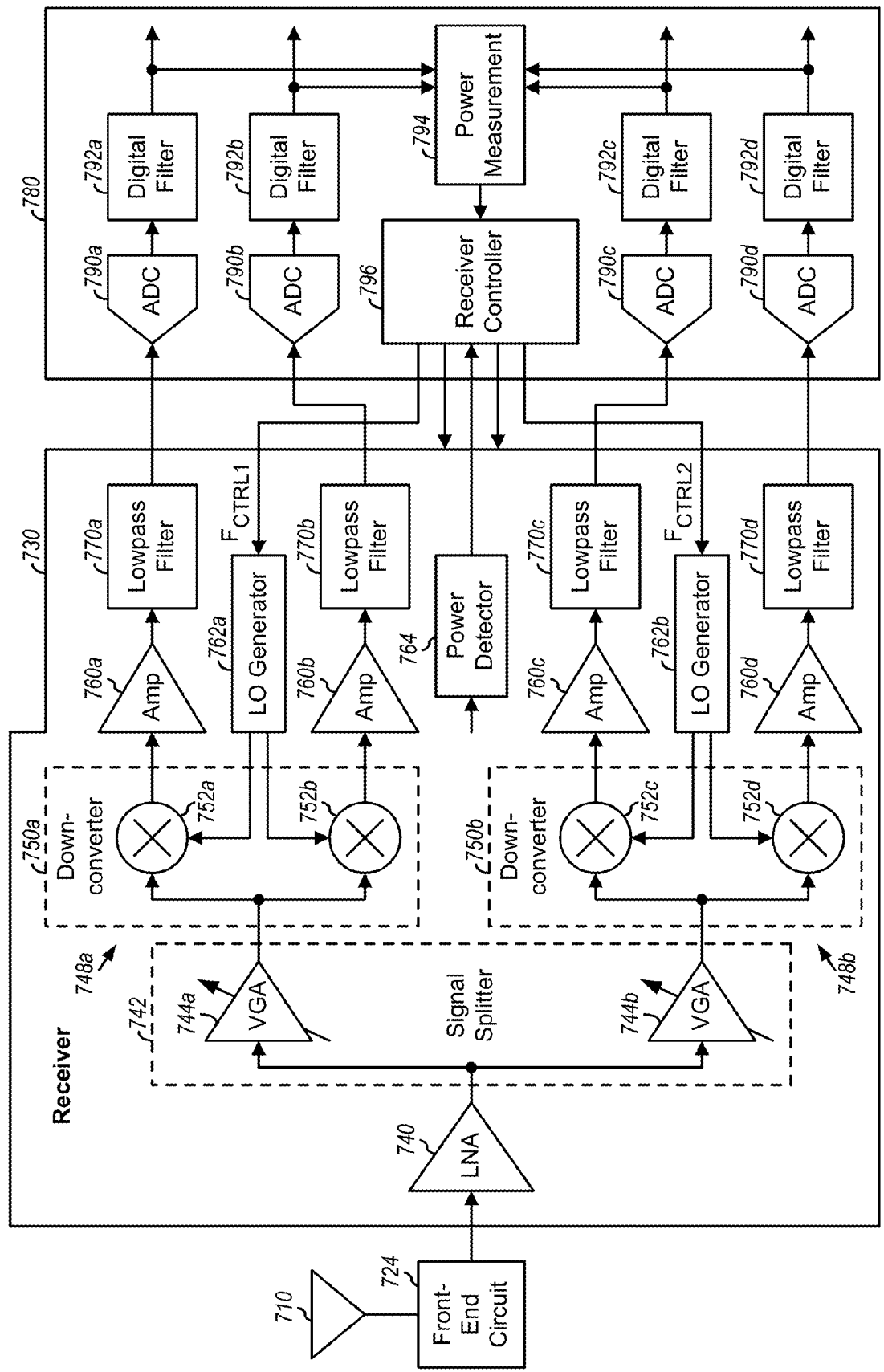
FIG. 7 shows a block diagram of a receiver with two downconverters.

FIG. 7 shows a block diagram of an exemplary design of a receiver 730 with multiple downconverters. Receiver 730 can provide good performance for multiple transmissions on balanced or imbalanced carriers. Receiver 730 may be used for any one of receivers 230 in FIG. 2.

An antenna 710 receives downlink signals from eNBs and/or other transmitting stations and provides a received RF signal. A front-end circuit 724 routes and/or filters the received RF signal and provides an input RF signal to receiver 730. Antenna 710 and front-end circuit 724 may correspond to antenna 210 and front-end circuit 224, respectively, or may correspond to antenna 212 and front-end circuit 226, respectively, in FIG. 2.

Within receiver 730, an LNA 740 receives and amplifies the input RF signal and provides an amplified RF signal. A signal splitter 742 receives the amplified RF signal and provides a first RF signal to a first receiver unit 748a and a second RF signal to a second receiver unit 748b. In the exemplary design shown in FIG. 7, signal splitter 742 includes two variable gain amplifiers (VGAs) 744a and 744b. VGA 744a amplifies the amplified RF signal from LNA 740 based on a first variable gain and provides the first RF signal. VGA 744b amplifies the amplified RF signal from LNA 740 based on a second variable gain and provides the second RF signal. The gain of each VGA 744 may be set to provide good performance for one or more transmissions on one or more carriers being processed by that VGA 744. For example, the gain of a VGA for a weak transmission may be set higher than nominal whereas the gain of a VGA for a strong transmission may be set lower than nominal Independent gain control of VGAs 744a and 744b may help to mitigate a stronger signal from saturating an ADC and corrupting a weaker signal at the ADC. This may be achieved by independently applying a suitable gain for each of the two carriers C1 and C2 using VGAs 744a and 744b. Avoiding ADC saturation may be desirable because RSB may be corrected digitally, but digital correction of RSB may be possible only if the ADCs are not saturated. Signal splitter 742 may also be implemented in other manners, e.g., with two fixed-gain amplifiers or buffers. Signal splitter 742 may also be omitted, and LNA 740 may generate the first and second RF signals, e.g., with two cascode transistors coupled to a gain transistor within the LNA.

Within receiver unit 748a, a downconverter 750a downconverts the first RF signal from RF to baseband and provides first I and Q downconverted signals ($I_{DC1}$ and $Q_{DC1}$). Downconverter 750a includes mixers 752a and 752b that downconvert the first RF signal with first I and Q LO signals ($I_{LO1}$ and $Q_{LO1}$) from an LO generator 762a and provides the $I_{DC1}$ and $Q_{DC1}$ signals, respectively. LO generator 762a generates the $I_{LO1}$ and $Q_{LO1}$ signals at a first mixing frequency based on a first frequency control ($F_{CTRL1}$) from a data processor 780, which is another exemplary design of data processor 280 in FIG. 2. The $I_{DC1}$ and $Q_{DC1}$ signals from mixers 752a and 752b are amplified by amplifiers 760a and 760b and filtered by lowpass filters 770a and 770b to generate first I and Q baseband signals ($I_{BB1}$ and $Q_{BB1}$). Receiver 730 provides the $I_{BB1}$ and $Q_{BB1}$ signals to data processor 780.

Within receiver unit 748b, a downconverter 750b downconverts the second RF signal from RF to baseband and provides second I and Q downconverted signals ($I_{DC2}$ and $Q_{DC2}$). Downconverter 750b includes mixers 752c and 752d that downconvert the second RF signal with second I and Q LO signals ($I_{LO2}$ and $Q_{LO2}$) from an LO generator 762b and provides the $I_{DC2}$ and $Q_{DC2}$ signals, respectively. LO generator 762b generates the $I_{LO2}$ and $Q_{LO2}$ signals at a second mixing frequency based on a second frequency control ($F_{CTRL2}$) from data processor 780. The second mixing frequency for receiver unit 748b may be different from the first mixing frequency for receiver unit 748a, as described below. The $I_{DC2}$ and $Q_{DC2}$ signals from mixers 752c and 752d are amplified by amplifiers 760c and 760d and filtered by lowpass filters 770c and 770d to generate second I and Q baseband signals ($I_{BB2}$ and $Q_{BB2}$). Receiver unit 748b provides the $I_{BB2}$ and $Q_{BB2}$ signals to data processor 780.

Within data processor 780, ADCs 790a and 790b receive and digitize the $I_{BB1}$ and $Q_{BB1}$ signals from receiver unit 748a and provide I and Q ADC samples for a first set of at least one carrier. Similarly, ADCs 790c and 790d receive and digitize the $I_{BB2}$ and $Q_{BB2}$ signals and provide I and Q ADC samples for a second set of at least one carrier. Digital filters 792a to 792d filter the ADC samples from ADCs 790a to 790d, respectively, and provide filtered samples. The filtered samples from filters 792 and/or the ADC samples from ADCs 790 may be digitally processed (e.g., demodulated and decoded) to recover data sent to UE 110.

A power measurement unit 794 may measure the received power of transmissions on different carriers based on the filtered samples and/or the ADC samples, as described below. A power detector 764 may measure the received power of the received RF signal, the input RF signal, and/or baseband signals within receiver units 748. A receiver controller 796 may control the operation of receiver 730 based on received power measurements from unit 794 and/or power detector 764.

FIG. 7 shows an exemplary design of receiver 730 with a direct-conversion architecture, which frequency converts a signal between RF and baseband in one step. Direct-conversion is also commonly referred to as zero intermediate frequency (ZIF) conversion. A receiver may also be implemented with a super-heterodyne architecture that converts a signal between RF and baseband in multiple steps.

In general, the conditioning of the signals in a receiver may be performed by one or more stages of mixers, amplifiers, filters, etc. The circuits in a receiver may be arranged differently from the arrangement shown in FIG. 7. For example, lowpass filters 770 may be located before amplifiers 760 instead of after amplifiers 760. Other circuits not shown in FIG. 7 may also be used to condition the signals in a receiver. For example, a buffer and/or a filter may be inserted between LNA 740 and downconverters 750. Amplifiers may also be inserted after lowpass filters 770. Some circuits in FIG. 7 may also be omitted. All or a portion of receiver 730 may be implemented on one or more analog ICs, RFICs, mixed-signal ICs, circuit modules, etc.

Figure 8:
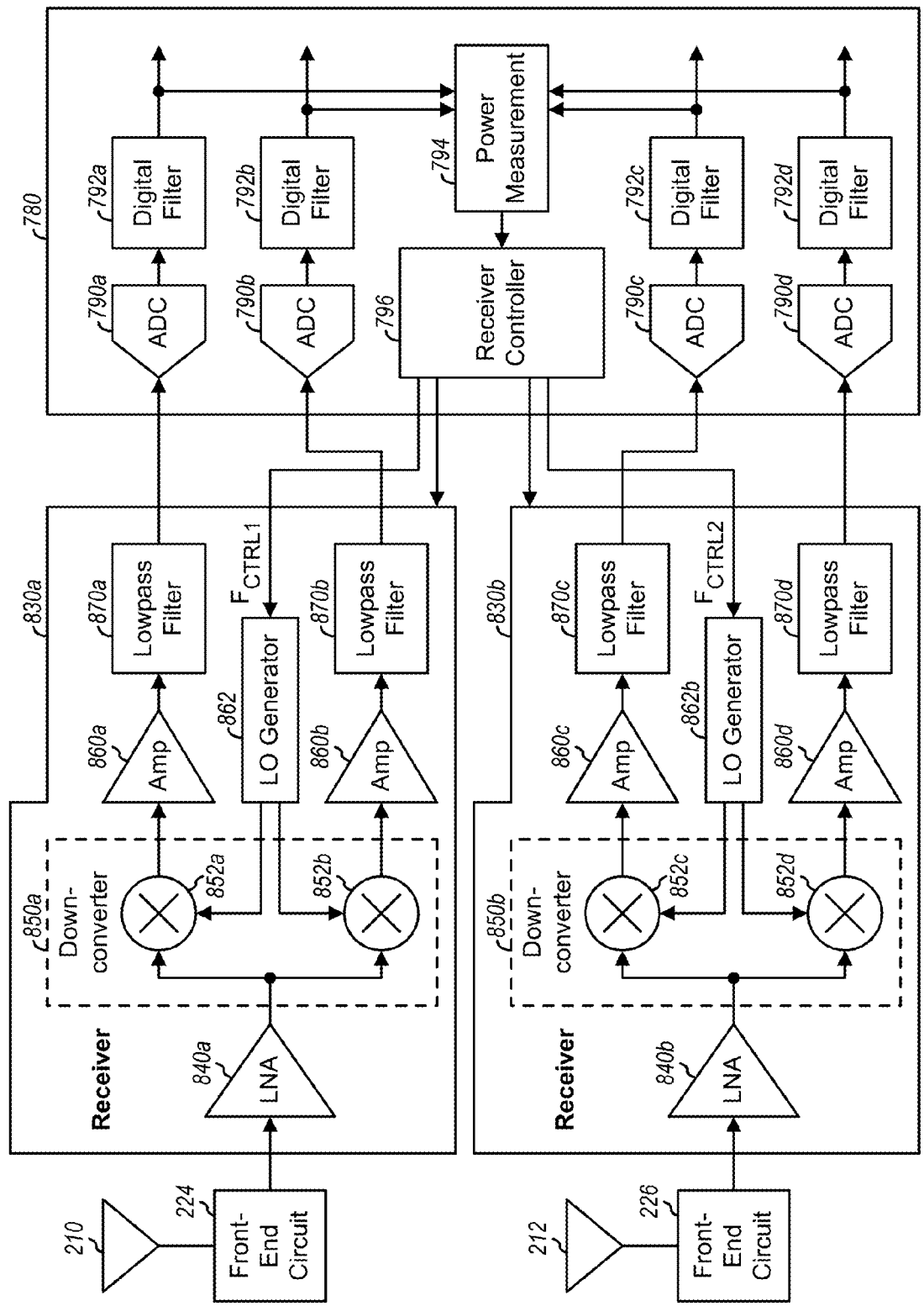
FIG. 8 shows a block diagram of two receivers.

FIG. 8 shows a block diagram of an exemplary design of receivers 830a and 830b that can provide good performance for multiple transmissions on balanced or imbalanced carriers. Receiver 830a may be used for any one of receivers 230aa to 230ak in FIG. 2 and is coupled to antenna 210 via front-end circuit 224. Receiver 830b may be used for any one of receivers 230ba to 230bm in FIG. 2 and is coupled to antenna 212 via front-end circuit 226. Each receiver 830 includes an LNA 840, a downconverter 850 comprising two mixers 852, two amplifiers 860, two lowpass filters 870, and an LO generator 862, which are coupled as described above for FIG. 4. Receivers 830a and 830b may be implemented on the same or different analog ICs, RFICs, mixed-signal ICs, circuit modules, etc.

Receivers 830a and 830b may be used to receive multiple transmissions on multiple carriers. For example, receiver 830a may be used to receive a transmission on carrier C1. Within receiver 830a, downconverter 850a may downconvert an amplified RF signal from LNA 840a with $I_{LO1}$ and $Q_{LO1}$ signals at a first mixing frequency from LO generator 862a. Receiver 830b may be used to receive a transmission on carrier C2. Within receiver 830b, downconverter 850b may downconvert an amplified RF signal from LNA 840b with $I_{LO2}$ and $Q_{LO2}$ signals at a second mixing frequency from LO generator 862b.

Figure 9:
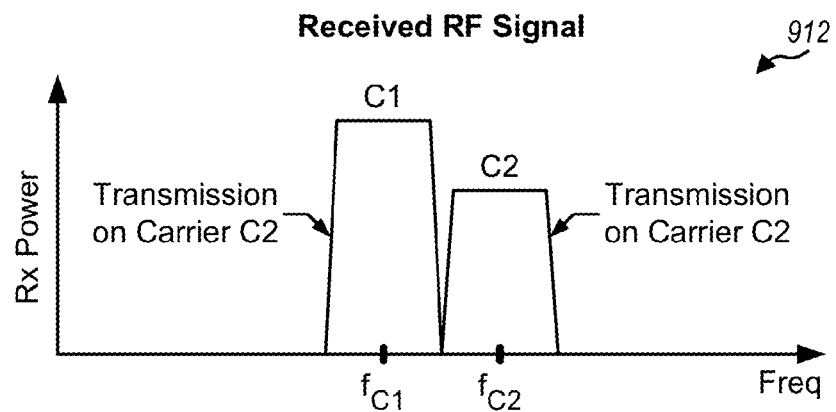
FIG. 9 shows downconversion of transmissions on two imbalanced carriers using two downconverters.
Figure 9:
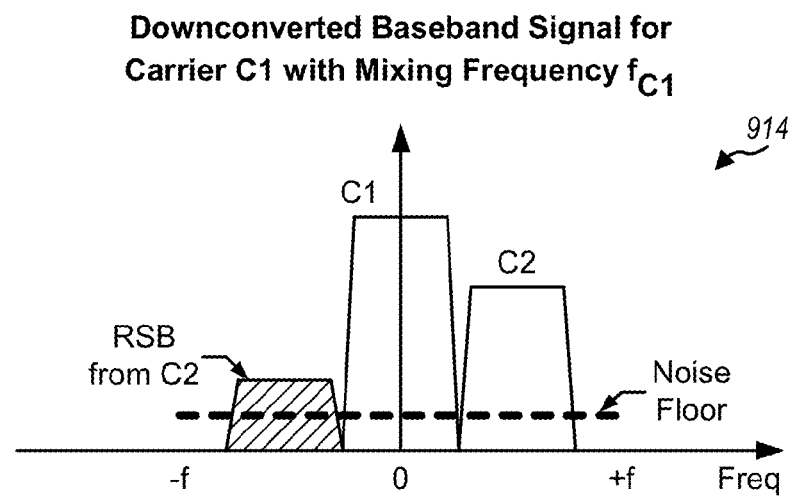
Figure 9:
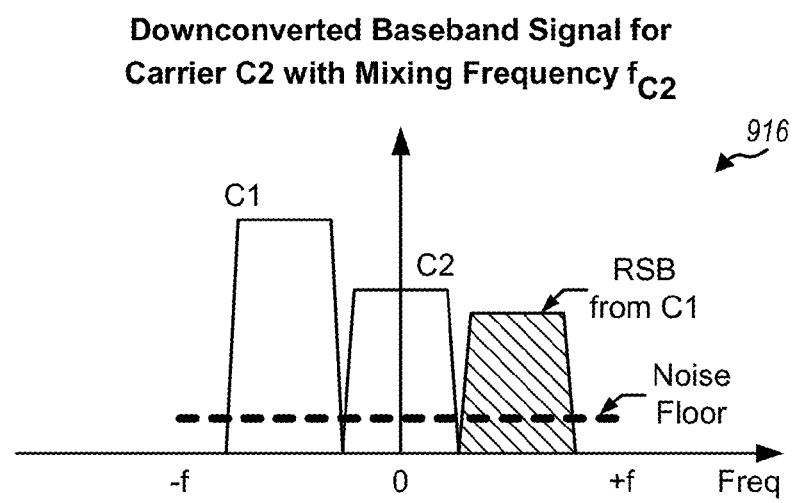

FIG. 9 shows downconversion of two transmissions on two imbalanced carriers C1 and C2 using two downconverters, which may be included in two receiver units 748 in FIG. 7 or two receivers 830 in FIG. 8. An illustration 912 shows a received RF signal from an antenna. The received RF signal includes two transmissions on two carriers C1 and C2. Carrier C1 is centered at a frequency of $f_{C1}$, and carrier C2 is centered at a frequency of $f_{C2}$. The two transmissions on carriers C1 and C2 are received at different received power levels of $P_{C1}$ and $P_{C2}$ with imbalanced carriers.

An illustration 914 shows the baseband signals for the transmission on carrier C1 from a receiver. The received RF signal is downconverted by a first downconverter with a first LO signal at a frequency of $f_{C1}$, which results in the transmission on carrier C1 being centered at DC. As shown by illustration 914, I/Q imbalances in the receiver results in the transmission on carrier C2 causing RSB that appears to the left of carrier C1. Hence, the transmission on carrier C1 does not observe the RSB due to the transmission on carrier C2.

An illustration 916 shows the baseband signals for the transmission on carrier C2 from the same or different receiver. The received RF signal is downconverted by a second downconverter with a second LO signal at a frequency of $f_{C2}$, which results in the transmission on carrier C2 being centered at DC. As shown by illustration 916, I/Q imbalances in the receiver results in the transmission on carrier C1 causing RSB that appears to the right of carrier C2. Hence, the transmission on carrier C2 does not observe the RSB due to the transmission on carrier C1. The C/N of the transmission on carrier C2 is not degraded by the RSB due to the transmission on carrier C1.

Figure 10:
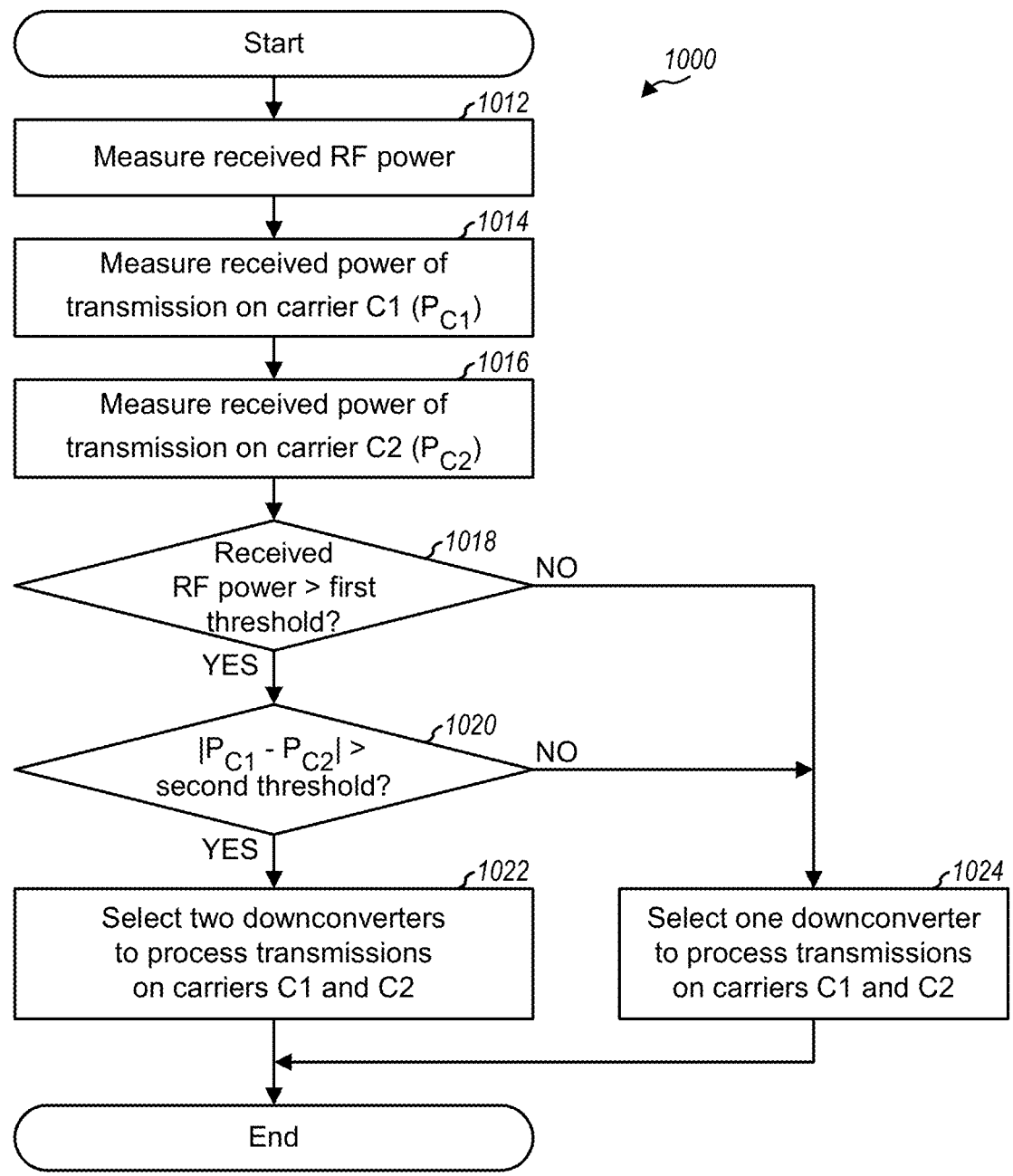
FIG. 10 shows a process for selecting one or two downconverters to process two transmissions on two carriers.

FIG. 10 shows an exemplary design of a process 1000 for selecting one or two downconverters to process two transmissions on two carriers C1 and C2. The received RF power may be measured (block 1012). The received power ($P_{C1}$) of the transmission on carrier C1 may be measured (block 1014).

The received power ($P_{C2}$) of the transmission on carrier C2 may also be measured (block 1016).

A determination may be made whether the received RF power is greater than a first threshold (block 1018). If the answer is 'Yes' for block 1018, then a determination may be made whether the absolute difference between $P_{C1}$ and $P_{C2}$, which is indicative of the imbalance between carriers C1 and C2, is greater than a second threshold (block 1020). If the received RF power is larger than the first threshold and the imbalance between carriers C1 and C2 is larger than the second threshold, then two downconverters (e.g., in two receiver units 748 in FIG. 7 or two receivers 830 in FIG. 8) at different mixing frequencies may be selected and used to process the two transmissions on carriers C1 and C2 (block 1022). Otherwise, one downconverter (e.g., in one receiver unit 748 in FIG. 7 or one receiver 830 in FIG. 8) may be selected to process the two transmissions on carriers C1 and C2 if (i) the received RF power is less then the first threshold or (ii) the imbalance between carriers C1 and C2 is less than the second threshold (block 1024). Condition (i) may correspond to the case of RSB being lower than the noise floor, as shown by illustration 614 in FIG. 6A. In this case, using two downconverters may marginally improve performance while consuming battery power. Condition (ii) may correspond to the case of acceptable degradation of C/N of the weaker transmission due to RSB from the stronger transmission. In both cases, a single receiver unit may be used in order to reduce power consumption.

The first and second thresholds may be determined in various manners, e.g., based on a tradeoff between performance and power consumption. The first and second thresholds may also be determined based on measurements, computer simulation, etc.

Multiple downconverters may be used to receive multiple transmissions on imbalanced carriers, as described above. Multiple downconverters may also be used to receive multiple transmissions on multiple carriers in order to mitigate interference from interfering transmissions on adjacent or nearby carriers.

Figure 11:
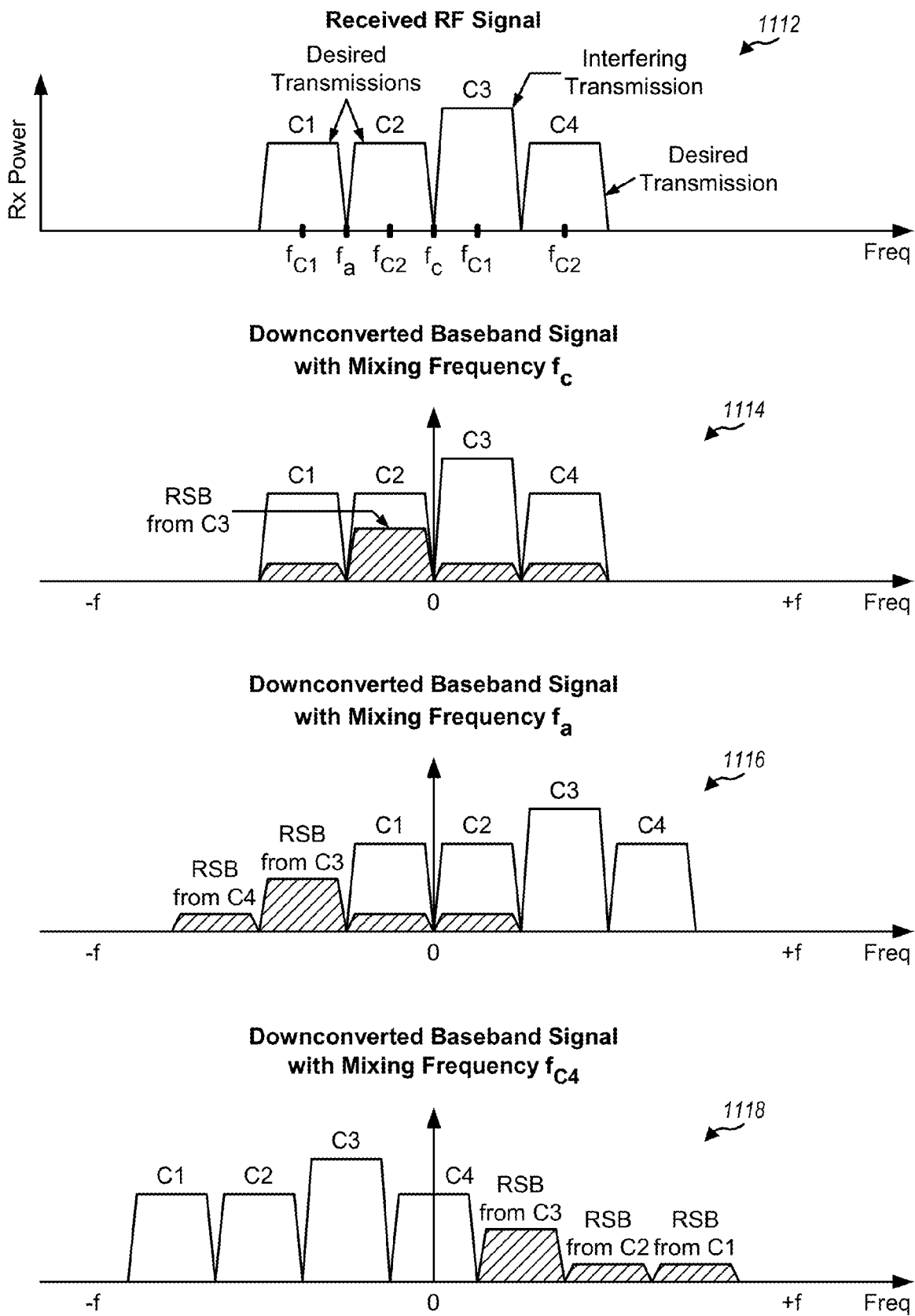
FIGS. 11 and 12 show downconversion of transmissions on three carriers.

FIG. 11 shows downconversion of desired transmissions on three carriers using one or two downconverters. In the example shown in FIG. 11, three transmissions are sent on carriers C1, C2 and C4 to UE 110. A transmission is sent on carrier C3 to another UE 112. Carriers C1 to C4 are adjacent to each other in frequency, as shown in FIG. 11. UE 110 may receive its transmissions on carriers C1, C2 and C4 at similar received power levels and may receive the interfering transmission on carrier C3 at a much higher received power level, as shown by an illustration 1112.

An illustration 1114 shows downconversion of the three desired transmissions on the three carriers using one downconverter with an LO signal at a frequency of $f_c$, which is the center frequency of the four carriers C1 to C4. In this case, RSB due to the interfering transmission on carrier C3 acts as noise to the desired transmission on carrier C2. C/N of the desired transmission on carrier C2 may be degraded by the RSB due to the interfering transmission on carrier C3.

Illustrations 1116 and 1118 show downconversion of the three desired transmissions on the three carriers using two downconverters. A first downconverter performs downconversion with a first LO signal at a frequency of $f_a$, which is the center frequency of carriers C1 and C2. The spectrum of a baseband signal from the first downconverter is shown by illustration 1116. Because the first LO signal is at frequency $f_a$, RSB due to the interfering transmission on carrier C3 falls to the left of carrier C1 and does not degrade the C/N of the desired transmissions on carriers C1 and C2. A second downconverter performs downconversion with a second LO signal at a frequency of $f_{C4}$, which is the center frequency of carrier C4. The spectrum of a baseband signal from the second downconverter is shown by illustration 1118. Because the second LO signal is at frequency $f_{C4}$, RSB due to the interfering transmission on carrier C3 falls to the right of carrier C4 and does not degrade the C/N of the desired transmission on carrier C4.

Figure 12:
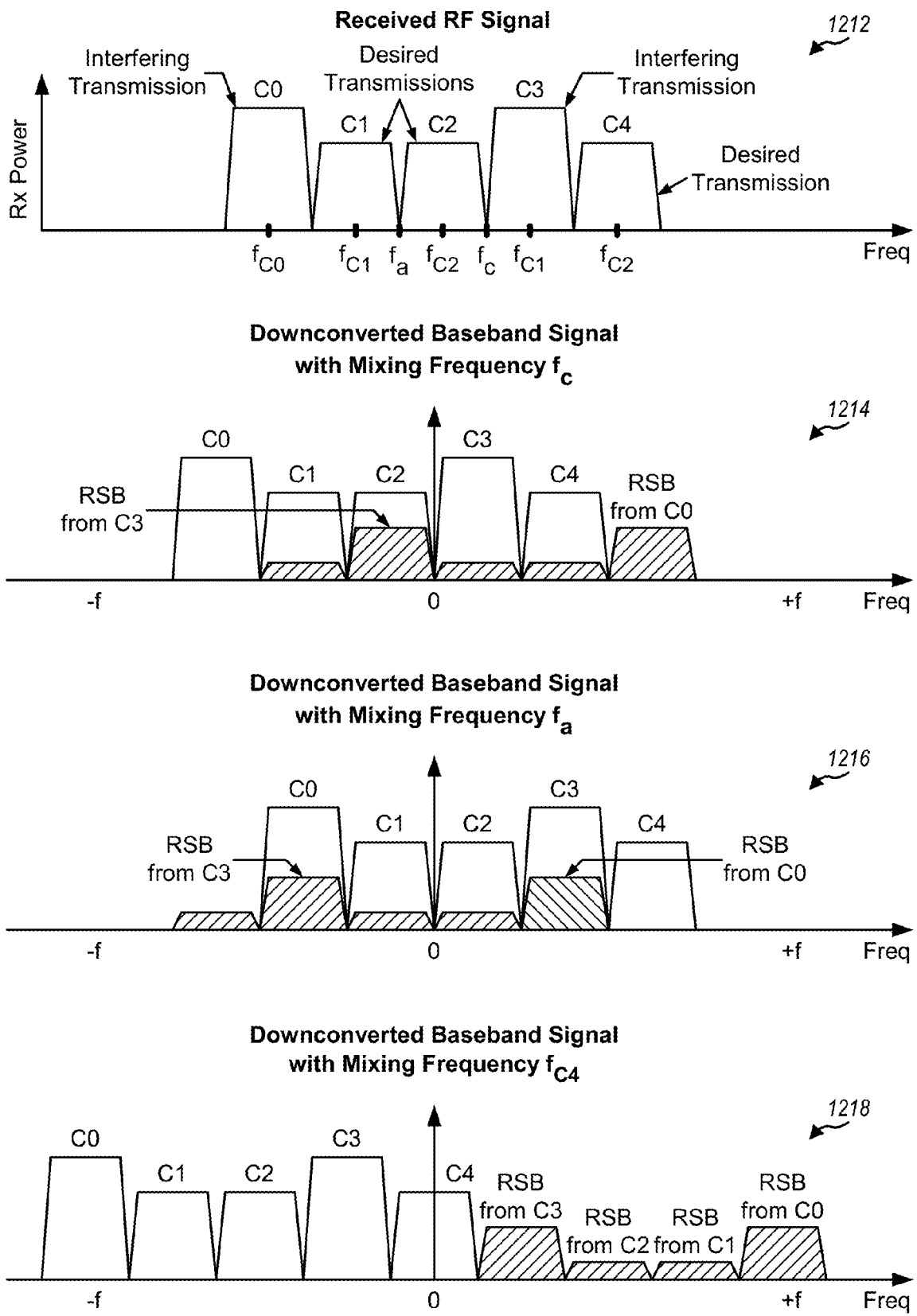

FIG. 12 shows downconversion of desired transmissions on three carriers using two downconverters. In the example shown in FIG. 12, three transmissions are sent on carriers C1, C2 and C4 to UE 110. Two transmissions are sent on two carriers C0 and C3 to one or more other UEs. Carriers C0 to C4 are adjacent to each other in frequency, as shown in FIG. 12. UE 110 may receive its transmissions on carriers C1, C2 and C4 at similar received power levels and may receive the interfering transmissions on carriers C0 and C3 at much higher received power levels, as shown by an illustration 1212.

An illustration 1214 shows downconversion of the three desired transmissions on the three carriers using one downconverter with an LO signal at a frequency of $f_c$, which is the center frequency of the carriers C1 to C4. In this case, RSB due to the interfering transmission on carrier C3 acts as noise to the desired transmission on carrier C2. C/N of the desired transmission on carrier C2 may be degraded by the RSB due to the interfering transmission on carrier C3.

Illustrations 1216 and 1218 show downconversion of the three desired transmissions on the three carriers using two downconverters. A first downconverter performs downconversion with a first LO signal at a frequency of $f_a$, which is the center frequency of carriers C1 and C2. The spectrum of a baseband signal from the first downconverter is shown by illustration 1216. RSBs due to the interfering transmissions on carriers C0 and C3 do not fall on carrier C1 or C2 and do not degrade the C/N of the desired transmissions on carriers C1 and C2. A second downconverter performs downconversion with a second LO signal at a frequency of $f_{C4}$, which is the center frequency of carrier C4. The spectrum of a baseband signal from the second downconverter is shown by illustration 1218. RSBs due to the interfering transmissions on carriers C0 and C3 do not fall on carrier C4 and do not degrade the C/N of the desired transmission on carrier C4.

As shown in FIGS. 11 and 12, the frequencies of LO signals for downconverters may be selected such that RSBs due to interfering transmissions on nearby carriers do not (or minimally) overlap desired transmissions. This may avoid (or mitigate) degradation of C/N of the desired transmission due to the RSBs from the interfering transmissions.

In an exemplary design, one or more downconverters may be selected to receive multiple transmissions on multiple carriers by determining whether RSBs from interfering transmissions sufficiently degrade C/N of desired transmissions. A determination of how many downconverters to use and what mixing frequency to use for each downconverter may be performed in various manners. In an exemplary design, different hypotheses may be evaluated, with each hypothesis corresponding to a specific number of downconverters and a specific mixing frequency for each downconverter. The hypothesis that can provide the best performance may be selected for use. Each hypothesis may be evaluated by (i) performing downconversion for each downconverter with an LO signal at a mixing frequency selected for that downconverter and (ii) determining C/N of each desired transmission by taking into account RSBs due to desired and interfering transmissions after downconversion.

For the example shown in FIG. 11, a first hypothesis may correspond to one downconverter at a mixing frequency of $f_c$, as shown by illustration 1114. This hypothesis may result in excessive degradation of C/N of the desired transmission on carrier C2. A second hypothesis may correspond to two downconverters at mixing frequencies of $f_a$ and $f_{C4}$, as shown by illustrations 1116 and 1118. This hypothesis may avoid degradation of C/N of the desired transmissions on carriers C1, C2 and C4 due to the interfering transmission on carrier C3. One or more additional hypotheses may also be evaluated.

In general, a given hypothesis to evaluate may cover one or more downconverters. Each downconverter may be used for one or more desired transmissions on one or more carriers. For each downconverter, degradation of C/N of the desired transmissions may be determined based on (i) the received power of the desired transmissions and (ii) the received power of interfering transmissions on carriers that can cause RSBs falling on the carriers with desired transmissions. A carrier with an interfering transmission may be referred to as an interfering carrier, and a carrier with a desired transmission may be referred to as a desired carrier. Interfering carriers for each downconverter may be determined based on the known frequencies of desired carriers and the mixing frequency for that downconverter. Received powers of desired transmissions as well as received powers of interfering transmissions may be determined by making narrowband power measurements over one or more carriers of interest. A receiver may be configured to make measurements of narrowband power of one or more carriers by (i) selecting a suitable frequency for an LO generator, (ii) selecting a suitable bandwidth for filters (e.g., filter 770 and/or 792 in FIG. 7) in the receive path if the filters are tunable, and (iii) measuring the received power of digital samples. A narrowband power measurement may also be made in other manners, e.g., based on an analog baseband signal instead of digital samples.

Degradation of C/N of desired transmissions may be determined based on narrowband power measurements for interfering transmissions (or interference power) and narrowband power measurements for desired transmissions (or desired power). In one exemplary design, excessive degradation of C/N of the desired transmissions may be declared if the interference power exceeds a predetermined threshold. This exemplary design may be akin to determining whether the received RF signal exceeds the first threshold in block 918 in FIG. 9. In another exemplary design, excessive degradation of C/N of the desired transmissions may be declared if the difference between the interference power and the desired power exceeds a predetermined delta. This exemplary design may be akin to determining whether the difference between the received powers of two transmissions exceeds the second threshold in block 1020 in FIG. 10. In yet another exemplary design, excessive degradation of C/N of the desired transmissions may be declared if both (i) the interference power exceeds a predetermined threshold and (ii) the difference between the interference power and the desired power exceeds the predetermined delta. For all exemplary designs, multiple downconverters may be selected if excessive C/N degradation is declared, and a single downconverter may be selected if excessive C/N degradation is not declared.

In another exemplary design, either one or two downconverters may be selected based on wideband power and narrowband power, both of which may be computed digitally. In one design, wideband power ($P_{WB}$) may be computed based on I and Q ADC samples ($I_{SAMP}$ and $Q_{SAMP}$), as follows:

$$P_{WB} = \Sigma(I_{SAMP}^2 + Q_{SAMP}^2). \qquad \text{Eq (4)}$$

The wideband power measurement in equation (4) assumes that analog filters located after downconverters have wide bandwidth and pass all or most of the band of interest.

In one design, narrowband power ($P_{NB}$) may be computed based on filtered samples ($I_{FIL}$ and $Q_{FIL}$) from digital filters 792 in FIG. 7, as follows:

$$P_{NB} = \Sigma(I_{FIL}^2 + Q_{FIL}^2). \qquad \text{Eq (5)}$$

The narrowband power measurement in equation (5) may be for one or more desired carriers covered by a downconverter. Wideband power and narrowband power may also be measured in other manners. For example, wideband power may be measured by power detector 764 in FIG. 7 based on the amplified RF signal from LNA 740. Narrowband power may be measured based on a filtered baseband signal from lowpass filters 770.

Figure 13:
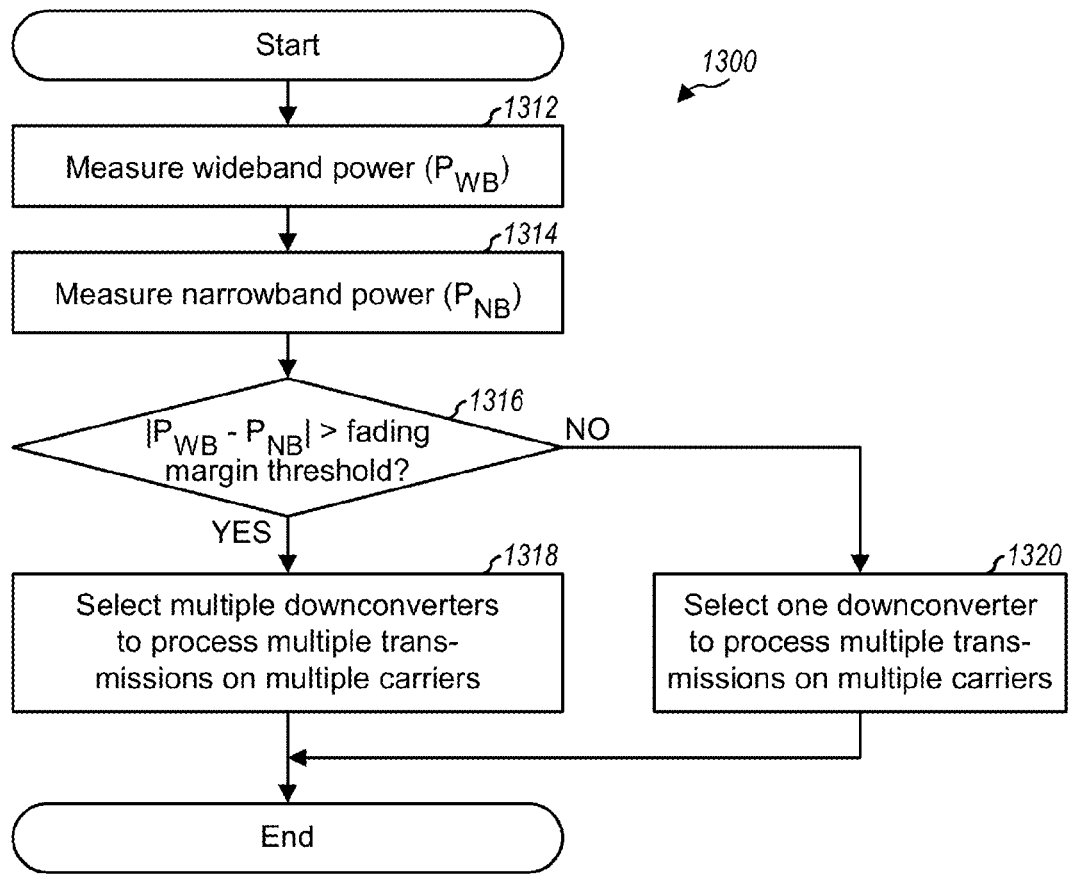
FIG. 13 shows a process for selecting one or two downconverters to process multiple transmissions on multiple carriers.

FIG. 13 shows an exemplary design of a process 1300 for selecting one or two downconverters to process multiple transmissions on multiple carriers. Wideband power may be measured, e.g., based on ADC samples as shown in equation (4) (block 1312). Narrowband power may also be measured, e.g., based on filtered samples as shown in equation (5) (block 1314). A determination may be made whether the difference between the wideband power and the narrowband power is greater than a fading margin threshold (block 1316). The fading margin threshold may be selected based on a tradeoff between performance and power consumption. If the answer is 'Yes' for block 1316, then multiple downconverters at different mixing frequencies may be selected and used to process the multiple transmissions on the multiple carriers (block 1318). Otherwise, one downconverter may be selected to process the multiple transmissions on the multiple carriers (block 1320).

In one design, a single value may be used for each threshold to select either one or two downconverters for use. In another design, multiple values may be used for each threshold in order to provide hysteresis. For example, a first set of values for the first and second thresholds may be used in FIG. 10 when switching from one downconverter to two downconverters. A second set of values for the first and second thresholds may be used in FIG. 10 when switching from two downconverters to one downconverter.

In general, it may be desirable to use a single downconverter (e.g., in one receiver unit 748 in FIG. 7 or one receiver 830 in FIG. 8) to receive multiple transmissions on multiple carriers whenever possible in order to reduce power consumption. For example, a single downconverter may be used when the RSBs falling on carriers of interest are below the noise floor, as shown in FIG. 6A. It may be desirable to use multiple downconverters (e.g., two downconverters in two receiver units 748 in FIG. 7 or two receivers 830 in FIG. 8) to receive multiple transmissions on multiple carriers when sufficient improvement in C/N of a weaker transmission can be expected. For example, two downconverters may be used when the RSB of a stronger transmission on one carrier is above the noise floor and limits the C/N of a weaker transmission on another carrier, as shown in FIGS. 6A and 6B.

One or two downconverters may be dynamically selected for use based on various criteria to process multiple transmissions on multiple carriers. Each downconverter can downconvert an RF signal with an LO signal at a suitable mixing frequency for a set of one or more carriers. Different downconverters may downconvert their RF signals with LO signals at different mixing frequencies in order to avoid or mitigate degradation of C/N of weaker transmissions due to RSB from stronger transmissions.

For clarity, the use of one or two downconverters to receive multiple transmissions on multiple carriers has been described above. In general, any number of downconverters may be used to receive any number of transmissions on different carriers. For example, a UE may be configured with up to five carriers for carrier aggregation in LTE Release 11. Hence, up to five downconverters may be used to receive up to five transmissions on up to five carriers. One downconverter may be used to receive desired transmissions on all carriers when C/N of these transmissions is not sufficiently degraded by imbalance between the carriers and/or due to interfering transmissions on nearby carriers. Alternatively, multiple downconverters may be used to receive desired transmissions on multiple carriers when imbalance between these carriers and/or interfering transmissions on nearby carriers sufficiently degrade C/N of the desired transmissions. In an extreme case, one downconverter may be used for a desired transmission on each carrier in order to avoid RSBs from transmissions on all other carriers. One or more values may be used for each threshold to determine how many downconverters to select for use.

In an exemplary design, an apparatus (e.g., a wireless device, an IC, a circuit module, etc.) may include first and second downconverters. The first downconverter (e.g., downconverter 750a in FIG. 7 or downconverter 850a in FIG. 8) may downconvert a first RF signal comprising multiple transmissions sent on multiple carriers to a wireless device (e.g., as shown at the top of FIG. 9) when the first downconverter is selected. The second downconverter (e.g., downconverter 750b in FIG. 7 or downconverter 850b in FIG. 8) may downconvert a second RF signal comprising the multiple transmissions sent on the multiple carriers when the second downconverter is selected. The first downconverter may be selected to perform downconversion when at least one criterion is not met. The first and second downconverters may be selected to perform downconversion based on different mixing frequencies when at least one criterion is met. The first and second downconverters may be implemented with the direct-conversion architecture or the super-heterodyne architecture.

In an exemplary design, the apparatus may further include an LNA (e.g., LNA 740 in FIG. 7). The LNA may amplify an input RF signal from an antenna and provide an amplified RF signal. The first and second RF signals may be generated based on the amplified RF signal. In another exemplary design, the apparatus may include first and second LNAs. The first LNA (e.g., LNA 840a in FIG. 8) may amplify a first input RF signal from a first antenna and provide the first RF signal. The second LNA (e.g., LNA 840b in FIG. 8) may amplify a second input RF signal from a second antenna and provide the second RF signal.

In an exemplary design, the apparatus may further include first and second amplifiers. The first amplifier (e.g., amplifier 744a in FIG. 7) may generate the first RF signal based on a first variable gain. The second amplifier (e.g., amplifier 744b in FIG. 7) may generate the second RF signal based on a second variable gain. In an exemplary design, the first and second variable gains may be independently adjusted based on the received power levels of the multiple transmissions on the multiple carriers. For example, the first variable gain may be determined based on a received power level of at least one transmission being downconverted by the first downconverter. The second variable gain may be determined based on a received power level of at least one other transmission being downconverted by the second downconverter. The first and second variable gains may be selected to avoid saturation of ADCs located after the first and second downconverters.

In an exemplary design, the multiple transmissions on the multiple carriers may comprise (i) a first transmission sent on a first carrier by a first base station to the wireless device and (ii) a second transmission sent on a second carrier by a second base station to the wireless device, e.g., as shown at the top of FIG. 9. The multiple transmissions may also comprise one or more additional transmissions, e.g., as shown at the top of FIGS. 11 and 12. The first base station may or may not be co-located with the second base station.

In an exemplary design, the at least one criterion may comprise a first criterion that is met if the received power of a received RF signal at the wireless device is greater than a first threshold (e.g., block 1018 in FIG. 10). The at least one criterion may comprise a second criterion that is met if a difference between received powers of two of the multiple transmissions on two of the multiple carriers is greater than a second threshold (e.g., block 1020 in FIG. 10). One of the two transmissions may cause RSB acting as interference to the other one of the two transmissions (e.g., as shown in FIG. 6A). The at least one criterion may be defined to select two downconverters, when necessary, in order to avoid degradation of C/N of any desired transmission due to RSB from undesired transmissions, as described above.

In an exemplary design, the at least one criterion may comprise a criterion that is met if the received power of a first transmission on a first carrier exceeds the received power of a second transmission on a second carrier by a threshold. The first transmission may cause RSB falling on the second carrier and acting as interference to the second transmission. The second transmission may be one of the multiple transmissions sent to the wireless device. The first transmission may be another one of the multiple transmissions sent to the wireless device. Alternatively, the first transmission may be an interfering transmission sent to another wireless device.

In yet another exemplary design, the at least one criterion may comprise a criterion that is met if wideband power for a band comprising the multiple carriers exceeds narrowband power for one or more carriers by a threshold (e.g., block 1316 in FIG. 13). The at least one criterion may also comprise other criteria.

In an exemplary design, a first mixing frequency for the first downconverter and a second mixing frequency for the second downconverter may be selected to avoid RSB due to one or more interfering transmissions falling on the multiple carriers. For example, the multiple transmissions may comprise a first transmission on a first carrier at a first frequency and a second transmission on a second carrier at a second frequency, e.g., as shown in FIG. 9. As another example, the multiple transmissions may comprise two transmissions on two adjacent carriers centered at a first frequency and a third transmission on a third carrier at a second frequency, e.g., as shown in FIGS. 11 and 12. For both examples, the first downconverter may downconvert the first RF signal based on a first LO signal at the first frequency, and the second downconverter may downconvert the second RF signal based on a second LO signal at the second frequency when the first and second downconverters are selected.

Figure 14:
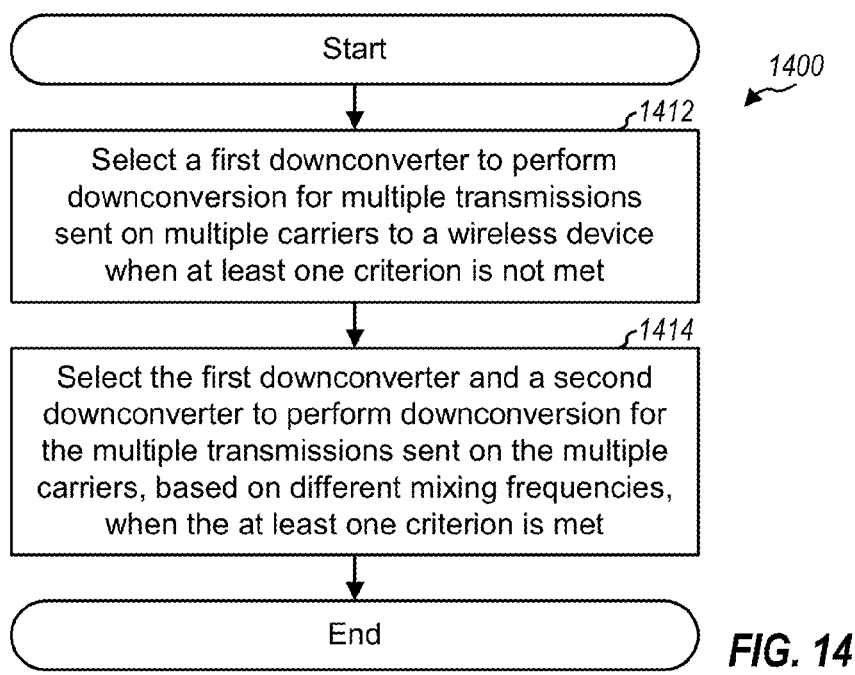
FIG. 14 shows a process for receiving transmissions on multiple carriers.

FIG. 14 shows an exemplary design of a process 1400 for receiving multiple transmissions for carrier aggregation. Process 1400 may be performed by a wireless device/UE (as described below) or by some other entity. A first downconverter may be selected to perform downconversion for multiple transmissions sent on multiple carriers to a wireless device when at least one criterion is not met (block 1412). The first downconverter and a second downconverter may be selected to perform downconversion for the multiple transmissions sent on the multiple carriers to the wireless device, based on different mixing frequencies, when the at least one criterion is met (block 1414). In an exemplary design, the at least one criterion may comprise (i) a first criterion that is met if the received power of a received RF signal at the wireless device is greater than a first threshold, or (ii) a second criterion that is met if a difference between the received powers of two of the multiple transmissions on two of the multiple carriers is greater than a second threshold, or (iii) a third criterion that is met if the received power of an interfering transmission on a first carrier exceeds the received power of a desired transmission on a second carrier by a third threshold, or (iv) some other criterion, or (v) a combination thereof.

The receivers and downconverters described herein may be implemented on an IC, an analog IC, an RFIC, a mixed-signal IC, an ASIC, a printed circuit board (PCB), an electronic device, etc. The receivers and downconverters may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), etc.

An apparatus implementing the receivers and downconverters described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
a first downconverter configured to downconvert a first radio frequency (RF) signal comprising multiple transmissions sent on multiple carriers to a wireless device, the first downconverter being selected to perform downconversion of the multiple carriers when at least one criterion is not met; and
a second downconverter configured to downconvert a second RF signal comprising the multiple transmissions sent on the multiple carriers, the first and second downconverters being selected to perform downconversion of the multiple carriers to recover data sent to the wireless device based on different mixing frequencies when the at least one criterion is met.

2. The apparatus of claim 1, further comprising:
a low noise amplifier (LNA) configured to amplify an input RF signal from an antenna and provide an amplified RF signal, the first and second RF signals being generated based on the amplified RF signal.

3. The apparatus of claim 1, further comprising:
a first low noise amplifier (LNA) configured to amplify a first input RF signal from a first antenna and provide the first RF signal; and
a second LNA configured to amplify a second input RF signal from a second antenna and provide the second RF signal.

4. The apparatus of claim 1, further comprising:
a first amplifier configured to generate the first RF signal based on a first variable gain; and
a second amplifier configured to generate the second RF signal based on a second variable gain.

5. The apparatus of claim 4, the first variable gain being determined based on a received power level of at least one transmission among the multiple transmissions, and the second variable gain being determined based on a received power level of at least one other transmission among the multiple transmissions.

6. The apparatus of claim 1, the multiple transmissions on the multiple carriers comprising a first transmission sent on a first carrier by a first base station to the wireless device and a second transmission sent on a second carrier by a second base station to the wireless device, the first base station being non co-located with the second base station.

7. The apparatus of claim 1, the at least one criterion comprising a criterion that is met if received power of a received RF signal is greater than a threshold.

8. The apparatus of claim 1, the multiple transmissions on the multiple carriers comprising a first transmission on a first carrier and a second transmission on a second carrier, and the at least one criterion comprising a criterion that is met if a difference between received power of the first transmission and received power of the second transmission is greater than a threshold.

9. The apparatus of claim 1, the at least one criterion comprising a criterion that is met if received power of a first transmission on a first carrier exceeds received power of a second transmission on a second carrier by a threshold, the second transmission being one of the multiple transmissions sent to the wireless device.

10. The apparatus of claim 1, the at least one criterion comprising a criterion that is met if wideband power for a band comprising the multiple carriers exceeds narrowband power for one or more carriers by a threshold.

11. The apparatus of claim 1, a first mixing frequency for the first downconverter and
a second mixing frequency for the second downconverter being selected to avoid residual sideband (RSB) due to one or more interfering transmissions falling on the multiple carriers.

12. The apparatus of claim 1, the multiple transmissions on the multiple carriers comprising a first transmission on a first carrier at a first frequency and a second transmission on a second carrier at a second frequency, and the first downconverter downconverting the first RF signal based on a first local oscillator (LO) signal at the first frequency and the second downconverter downconverting the second RF signal based on a second LO signal at the second frequency when the first and second downconverters are selected.

13. The apparatus of claim 1, the multiple transmissions on the multiple carriers comprising two transmissions on two adjacent carriers centered at a first frequency and a third transmission on a third carrier at a second frequency, and the first downconverter downconverting the first RF signal based on a first local oscillator (LO) signal at the first frequency and the second downconverter downconverting the second RF signal based on a second LO signal at the second frequency when the first and second downconverters are selected.

14. A method comprising:
selecting a first downconverter to perform downconversion of multiple carriers for multiple transmissions sent on the multiple carriers to a wireless device when at least one criterion is not met; and
selecting the first downconverter and a second downconverter to perform downconversion of the multiple carriers to recover data sent to the wireless device for the multiple transmissions sent on the multiple carriers, based on different mixing frequencies, when the at least one criterion is met.

15. The method of claim 14, the at least one criterion comprising a first criterion that is met if received power of a received radio frequency (RF) signal is greater than a first threshold, or a second criterion that is met if a difference between received powers of two of the multiple transmissions on two of the multiple carriers is greater than a second threshold, or a third criterion that is met if received power of an interfering transmission on a first carrier exceeds received power of a desired transmission on a second carrier by a third threshold, or a combination thereof.

16. The method of claim 14, the multiple transmissions on the multiple carriers comprising a first transmission on a first carrier at a first frequency and a second transmission on a second carrier at a second frequency, the method further comprising:
controlling the first downconverter to downconvert the first RF signal based on a first local oscillator (LO) signal at the first frequency and the second downconverter to downconvert the second RF signal based on a second LO signal at the second frequency when the first and second downconverters are selected.

17. An apparatus comprising:
means for selecting a first downconverter to perform downconversion of multiple carriers for multiple transmissions sent on the multiple carriers to a wireless device when at least one criterion is not met; and
means for selecting the first downconverter and a second downconverter to perform downconversion of the multiple carriers to recover data sent to the wireless device for the multiple transmissions sent on the multiple carriers, based on different mixing frequencies, when the at least one criterion is met.

18. The apparatus of claim 17, the at least one criterion comprising a first criterion that is met if received power of a received radio frequency (RF) signal is greater than a first threshold, or a second criterion that is met if a difference between received powers of two of the multiple transmissions on two of the multiple carriers is greater than a second threshold, or a third criterion that is met if received power of an interfering transmission on a first carrier exceeds received power of a desired transmission on a second carrier by a third threshold, or a combination thereof.

19. The apparatus of claim 17, the multiple transmissions on the multiple carriers comprising a first transmission on a first carrier at a first frequency and a second transmission on a second carrier at a second frequency, the apparatus further comprising:
means for controlling the first downconverter to downconvert the first RF signal based on a first local oscillator (LO) signal at the first frequency and the second downconverter to downconvert the second RF signal based on a second LO signal at the second frequency when the first and second downconverters are selected.

20. A computer program product, comprising:
a non-transitory computer-readable medium comprising:
code for causing at least one computer to select a first downconverter to perform downconversion of multiple carriers to recover data sent to the wireless device for multiple transmissions sent on the multiple carriers to a wireless device when at least one criterion is not met; and
code for causing the at least one computer to select the first downconverter and a second downconverter to perform downconversion of the multiple carriers for the multiple transmissions sent on the multiple carriers, based on different mixing frequencies, when the at least one criterion is met.

* * * * *